United States Patent
Wu et al.

(10) Patent No.: US 10,756,878 B2
(45) Date of Patent: Aug. 25, 2020

(54) COMMUNICATION METHOD AND COMMUNICATIONS APPARATUS

(71) Applicant: Huawei Technologies Co., Ltd., Shenzhen, Guangdong (CN)

(72) Inventors: Dan Wu, Chengdu (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 16/272,914

(22) Filed: Feb. 11, 2019

(65) Prior Publication Data

US 2019/0173653 A1 Jun. 6, 2019

Related U.S. Application Data

(63) Continuation of application No. PCT/CN2017/092903, filed on Jul. 14, 2017.

(30) Foreign Application Priority Data

Aug. 12, 2016 (CN) .......................... 2016 1 0664583

(51) Int. Cl.
H04L 12/50 (2006.01)
H04L 5/00 (2006.01)
(Continued)

(52) U.S. Cl.
CPC ............ H04L 5/0092 (2013.01); H04L 5/001 (2013.01); H04L 5/0044 (2013.01);
(Continued)

(58) Field of Classification Search
CPC ..................................................... H04L 12/50
(Continued)

(56) References Cited

U.S. PATENT DOCUMENTS

2009/0232071 A1 9/2009 Cho et al.
2010/0080265 A1* 4/2010 Moffatt ................. H04L 5/0007
375/135
(Continued)

FOREIGN PATENT DOCUMENTS

| CN | 101572683 A | 11/2009 |
| CN | 102761513 A | 10/2012 |
| WO | 2016023194 A1 | 2/2016 |

OTHER PUBLICATIONS

Takeda, Kazuaki, et al., "Investigation on Optimum Radio Parameter Design in Layered OFDMA for LTE-Advanced", 2009 IEEE 69th Vehicular Technology Conference, Apr. 26-29, 2009, total 5 pages.

*Primary Examiner* — Dang T Ton
(74) *Attorney, Agent, or Firm* — Slater Matsil, LLP

(57) ABSTRACT

The present disclosure discloses a communication method and a communications apparatus. The method includes: determining, by a first communications device, a first subcarrier spacing corresponding to a first subband; and performing, by the first communications device, signal transmission on the first subband with a second communications device based on the first subcarrier spacing; or determining, by a first communications device, a second subcarrier spacing corresponding to a second subband; and performing, by the first communications device, signal transmission on the second subband with a second communications device based on the second subcarrier spacing. The first subcarrier spacing is different from the second subcarrier spacing, and both the first subcarrier spacing and the second subcarrier spacing are integral multiples of a basic frequency spacing; and both bandwidth of the first subband and bandwidth of the second subband are integral multiples of the basic frequency spacing.

20 Claims, 6 Drawing Sheets

(51) Int. Cl.
 *H04L 27/26* (2006.01)
 *H04W 72/04* (2009.01)
(52) U.S. Cl.
 CPC ............ *H04L 5/0094* (2013.01); *H04L 27/26* (2013.01); *H04L 27/2607* (2013.01); *H04L 27/2628* (2013.01); *H04W 72/0406* (2013.01)
(58) Field of Classification Search
 USPC ........................................................ 370/400
 See application file for complete search history.

(56) References Cited

U.S. PATENT DOCUMENTS

2013/0064203 A1    3/2013   Ogawa
2017/0171010 A1    6/2017   Qu et al.
2017/0339530 A1*   11/2017   Maaref ................. H04L 5/0033

* cited by examiner

COMMUNICATION METHOD AND COMMUNICATIONS APPARATUS

CROSS-REFERENCE TO RELATED APPLICATIONS

This application is a continuation of International Application No. PCT/CN2017/092903 filed on Jul. 14, 2017, which claims priority to Chinese Patent Application No. 201610664583.7 filed on Aug. 12, 2016. The disclosures of the aforementioned applications are hereby incorporated by reference in their entireties.

TECHNICAL FIELD

The present disclosure relates to the field of communications technologies, and in particular, to a communication method and a communications apparatus.

BACKGROUND

The orthogonal frequency division multiplexing (OFDM) technology is a widely applied multi-carrier modulation technology. A data stream is split into a plurality of parallel subcarriers for transmission, and each subcarrier may have a relatively low data rate whereas a relatively high transmission rate is achieved on the whole. A disadvantage of OFDM is that OFDM has relatively severe out-of-band leakage, because a subcarrier waveform of OFDM is a sinc function with relatively severe out-of-band leakage. In a Long Term Evolution (LTE) system, a guard band that is 10% of a frequency spectrum needs to be reserved to ensure that there is no interference to an adjacent system. In addition, in OFDM, all subcarriers are required to achieve strict frequency synchronization and relatively good time synchronization. For this reason, OFDM has the following problems: A subcarrier spacing, a symbol length, a cyclic prefix (CP) length, and the like of OFDM need to keep consistent within Long Term Evolution (LTE) system bandwidth. For multi-user uplink OFDM transmission, signals sent by user equipments (UE) that occupy different subbands need to arrive at a base station (BS) almost at the same time, so as to meet a time synchronization requirement. In LTE, this objective is achieved through adjustment of a timing advance (TA), but relatively high signaling overheads are generated in a TA adjustment process. These problems restrict the LTE system from having a more flexible air interface design.

The foregoing problems are resolved after emergence of filtered orthogonal frequency division multiplexing (F-OFDM). F-OFDM is a new multi-carrier technology. In F-OFDM, system bandwidth is divided into a plurality of independent subbands through subband filtering. Different parameters such as the subcarrier spacing, the symbol length, and the CP length can be used in different subbands, and a method is provided to resolve intersymbol interference caused by a filter. Therefore, for each subband, most appropriate OFDM parameters can be selected based on a channel scenario or a service type, to achieve higher performance.

System bandwidth can be divided into a plurality of subbands by using the f-OFDM technology, and different subcarrier spacings can be used on different subbands. However, there is no ready-made method to resolve a frequency location relationship between subbands. As viewed from principles of the f-OFDM technology, the location relationship between subbands may be any relationship, but different methods have different complexity in signal processing and protocol processes.

SUMMARY

Embodiments of the present disclosure provide a communication method and a communications apparatus, to clarify characteristics of a subband and a location relationship between subbands, thereby implementing concise definitions of frequency resources and making a protocol simpler and more flexible.

To achieve the foregoing objectives, the following technical solutions are used in the embodiments of the present disclosure.

According to a first aspect, a communication method is provided, including:

determining, by a first communications device, a first subcarrier spacing corresponding to a first subband; and performing, by the first communications device, signal transmission on the first subband with a second communications device based on the first subcarrier spacing; or determining, by a first communications device, a second subcarrier spacing corresponding to a second subband; and performing, by the first communications device, signal transmission on the second subband with a second communications device based on the second subcarrier spacing, where the first subcarrier spacing is different from the second subcarrier spacing, and both the first subcarrier spacing and the second subcarrier spacing are integral multiples of a basic frequency spacing; and both bandwidth of the first subband and bandwidth of the second subband are integral multiples of the basic frequency spacing.

Optionally, the basic frequency spacing is a minimum subcarrier spacing in different subcarrier spacings, or the basic frequency spacing is a value that is smaller than a minimum subcarrier spacing and the minimum subcarrier spacing is divisible by the value is divisible by the minimum subcarrier spacing.

Optionally, a frequency spacing between a center frequency of the first subband and a center frequency of the second subband is an integral multiple of the basic frequency spacing.

Optionally, if the first subband is adjacent to the second subband, bandwidth of a guard band between the first subband and the second subband is an integral multiple of the basic frequency spacing.

Optionally, if the first communications device is a network device, the method further includes: sending, by the first communications device, of at least one of the following information: information about system bandwidth, information about the first subband, information about the second subband, and information about bandwidth of a guard band between the first subband and the second subband.

Optionally, if the first communications device is a terminal device, the method further includes: receiving, by the first communications device, at least one of the following information: information about system bandwidth, information about the first subband, information about the second subband, and information about bandwidth of a guard band between the first subband and the second subband.

Optionally, the determining, by a first communications device, a first subcarrier spacing corresponding to a first subband includes: determining, by the first communications device, the first subcarrier spacing based on the received information about the first subband; or the determining, by a first communications device, a second subcarrier spacing corresponding to a second subband includes: determining, by the first communications device, the second subcarrier spacing based on the received information about the second subband.

Optionally, the information about the first subband includes at least one of the following information: information about the bandwidth of the first subband, information about the first subcarrier spacing, information about a center frequency of the first subband, and type information of the first subband; and the information about the second subband includes at least one of the following information: information about the bandwidth of the second subband, information about the second subcarrier spacing, information about a center frequency of the second subband, and type information of the second subband.

In the technical solution provided in the first aspect, according to the foregoing setting, when the basic frequency spacing is determinate, various definitions of system frequency resources each may be expressed by using a positive integer. A benefit of this includes the following: Concise definitions of frequency resources can be implemented, making a protocol simpler and more flexible. In addition, the network device may indicate a necessary parameter configuration to the terminal device by using relatively low overheads.

According to a second aspect, a first communications device is provided, including:

a processing unit, configured to determine a first subcarrier spacing corresponding to a first subband, and a communications unit, configured to perform signal transmission on the first subband with a second communications device based on the first subcarrier spacing; or a processing unit, configured to determine a second subcarrier spacing corresponding to a second subband, and a communications unit, configured to perform signal transmission on the second subband with a second communications device based on the second subcarrier spacing.

The first subcarrier spacing is different from the second subcarrier spacing, and both the first subcarrier spacing and the second subcarrier spacing are integral multiples of a basic frequency spacing; and both bandwidth of the first subband and bandwidth of the second subband are integral multiples of the basic frequency spacing.

Optionally, for restriction of parameters such as the basic frequency spacing, a frequency spacing between a center frequency of the first subband and a center frequency of the second subband, and bandwidth of a guard band between the first subband and the second subband, refer to related descriptions of the first aspect.

Optionally, if the first communications device is a network device, the communications unit is further configured to send at least one of the following information: information about system bandwidth, information about the first subband, information about the second subband, and information about bandwidth of a guard band between the first subband and the second subband.

Optionally, if the first communications device is a terminal device, the communications unit is further configured to receive at least one of the following information: information about system bandwidth, information about the first subband, information about the second subband, and information about bandwidth of a guard band between the first subband and the second subband.

Optionally, the processing unit is specifically configured to: determine the first subcarrier spacing based on the received information about the first subband; or determine the second subcarrier spacing based on the received information about the second subband.

Optionally, for the information about the first subband and the information about the second subband, refer to descriptions of the foregoing first aspect.

According to a third aspect, a first communications device is provided, including: a bus, and a processor, a memory, and a transceiver that are separately connected to the bus.

The memory is configured to store an instruction.

The processor is configured to execute the instruction stored in the memory, so as to perform the following steps when executing the instruction:

determining a first subcarrier spacing corresponding to a first subband; and performing signal transmission on the first subband with a second communications device by using the transceiver based on the first subcarrier spacing; or determining a second subcarrier spacing corresponding to a second subband; and performing signal transmission on the second subband with a second communications device by using the transceiver based on the second subcarrier spacing.

The first subcarrier spacing is different from the second subcarrier spacing, and both the first subcarrier spacing and the second subcarrier spacing are integral multiples of a basic frequency spacing; and both bandwidth of the first subband and bandwidth of the second subband are integral multiples of the basic frequency spacing.

Optionally, for restriction of parameters such as the basic frequency spacing, a frequency spacing between a center frequency of the first subband and a center frequency of the second subband, and bandwidth of a guard band between the first subband and the second subband, refer to related descriptions of the first aspect.

Optionally, the communications device is configured to perform the method in the first aspect. For related content, refer to the first aspect.

According to a fourth aspect, a signal sending method is provided, including:

obtaining to-be-sent frequency domain data;

determining a first subband for transmitting the data, where a subcarrier spacing of the first subband is an integral multiple of a basic frequency spacing;

performing subcarrier mapping in the first subband for the data, where a subcarrier that is used to perform the subcarrier mapping is a subcarrier that is in the determined subband and located at a frequency that is an integral multiple of the subcarrier spacing of the subband, and frequency locations of subcarriers that are used to perform subcarrier mapping in different subbands do not overlap with each other;

performing inverse fast Fourier transformation (IFFT) on the subcarrier obtained after the subcarrier mapping, to obtain a time domain signal;

performing an operation of adding a cyclic prefix on the time domain signal;

filtering, by using a filter, the signal to which the cyclic prefix has been added; and sending the filtered signal.

Optionally, the method further includes: determining data bandwidth that is used to send the data in the first subband, the subcarrier spacing of the first subband, and a start frequency location at which the mapping is performed in the first subband; and determining, based on the data bandwidth, the subcarrier spacing of the first subband, and the start frequency location, a frequency location of the subcarrier that is used to perform the subcarrier mapping.

Optionally, if the signal is a downlink signal, the method further includes: notifying a terminal device of information about the data bandwidth that is used to send the data in the first subband, information about the start frequency location at which the mapping is performed in the first subband, and information about the subcarrier spacing of the first subband.

Optionally, the method further includes: notifying the terminal device of information about a number of the filter.

Optionally, if the data is downlink data, the method further includes: notifying user equipment of information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

In the method, the determined frequency location does not include a location of a zero frequency.

The method further includes: merging filtered signals of subbands; and the sending the filtered signal includes: sending a merged signal.

Optionally, the sent downlink signal may be expressed by using the following formula:

$$s(t) = \left( \sum_{k=k_0}^{-1} a_{0,k-k_0} \cdot e^{j2\pi k \Delta f_0 (t - N_{CP,0} T_s)} + \sum_{k=1}^{k_0 + N_0^{SC}} a_{0,k-k_0-1} \cdot e^{j2\pi k \Delta f_0 (t - N_{CP,0} T_s)} \right) \otimes$$

$$f_0(t) + \sum_{n \neq 0} \sum_{k=k_n}^{k_n + N_n^{SC} - 1} a_{n,k-k_n} \cdot e^{j2\pi k \Delta f_n (t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP (cyclic prefix) length of the subband n, $f_n(t)$ represents a subband filter of the subband n, $e^{j2\pi k \Delta f_n (t - N_{CP,n} T_s)}$ represents an inverse Fourier transformation factor, $T_s$ is a sampling time interval, and $\otimes$ represents a convolution operation.

Optionally, if the data is an uplink signal, the method further includes: receiving, from a network device, information about the data bandwidth that is used to send the data in the first subband, information about the subcarrier spacing of the first subband, and information about the start frequency location at which the subcarrier mapping is performed in the first subband.

Optionally, the method further includes: receiving information about a filter number of the first subband from the network device, and determining the filter based on the information about the filter number.

Optionally, the method further includes: receiving, from a network device, the data bandwidth that is used to send the data in the first subband, the start frequency location at which the subcarrier mapping is performed in the first subband, and a type or a number of the first subband, where the type or the number of the first subband is used to determine the subcarrier spacing of the first subband.

Optionally, the determined frequency location of the subcarrier includes a location of a zero frequency.

Optionally, the sent uplink signal may be expressed by using the following formula:

$$s(t) = \sum_{n} \sum_{k=k_n}^{k_n + k_n^{SC} - 1} a_{n,k-k_n} \cdot e^{j2\pi k \Delta f_n (t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP length of the subband n, $f_n(t)$ represents a subband filter of the subband n, $e^{j2\pi k \Delta f_n (t - N_{CP,n} T_s)}$ represents an inverse Fourier transformation factor, $T_s$ is a sampling time interval, and $\otimes$ represents a convolution operation.

In the technical solution provided in the fourth aspect, the foregoing configuration relationship between subbands is implemented through IFFT transformation, and no extra spectrum shift operation needs to be performed, thereby reducing implementation complexity.

According to a fifth aspect, a sending apparatus is provided, including:

a processing unit, configured to: obtain to-be-sent frequency domain data; determine a first subband for transmitting the data, where a subcarrier spacing of the first subband is an integral multiple of a basic frequency spacing; perform subcarrier mapping in the first subband for the data, where a subcarrier that is used to perform the subcarrier mapping is a subcarrier that is in the determined subband and located at a frequency that is an integral multiple of the subcarrier spacing of the subband, and frequency locations of subcarriers that are used to perform subcarrier mapping in different subbands do not overlap with each other; perform inverse fast Fourier transformation (IFFT) on the subcarrier obtained after the subcarrier mapping, to obtain a time domain signal; perform an operation of adding a cyclic prefix on the time domain signal; and filter, by using a filter, the signal to which the cyclic prefix has been added; and a sending unit, configured to send the filtered signal.

Optionally, the processing unit is further configured to: determine data bandwidth that is used to send the data in the first subband, the subcarrier spacing of the first subband, and a start frequency location at which the mapping is performed in the first subband; and determine, based on the data bandwidth, the subcarrier spacing of the first subband, and the start frequency location, a frequency location of the subcarrier that is used to perform the subcarrier mapping.

Optionally, if the signal is a downlink signal, the sending unit is further configured to notify a terminal device of information about the data bandwidth that is used to send the data in the first subband, information about the start frequency location at which the mapping is performed in the first subband, and information about the subcarrier spacing of the first subband.

Optionally, if the signal is a downlink signal, the sending unit is further configured to notify the terminal device of information about a number of the filter.

Optionally, if the signal is a downlink signal, the sending unit is further configured to: notify user equipment of information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location does not include a location of a zero frequency.

Optionally, the processing unit is further configured to merge filtered signals of subbands; and the sending unit is specifically configured to send a merged signal.

Optionally, the sent downlink signal may be expressed by using the following formula:

$$s(t) = \left( \sum_{k=k_0}^{-1} a_{0,k-k_0} \cdot e^{j2\pi k \Delta f_0 (t - N_{CP,0} T_s)} + \sum_{k=1}^{k_0+N_0^{SC}} a_{0,k-k_0-1} \cdot e^{j2\pi k \Delta f_0 (t - N_{CP,0} T_s)} \right) \otimes$$

$$f_0(t) + \sum_{n \neq 0} \sum_{k=k_n}^{k_n+N_n^{SC}-1} a_{n,k-k_n} \cdot e^{j2\pi k \Delta f_n (t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP (cyclic prefix) length of the subband n, $f_n(t)$ represents a subband filter of the subband n, $e^{j2\pi k \Delta f_n(t-N_{CP,n}T_s)}$ represents an inverse Fourier transformation factor, $T_s$ is a sampling time interval, and $\otimes$ represents a convolution operation.

Optionally, if the data is an uplink signal, the sending apparatus further includes a receiving unit, configured to receive, from a network device, information about the data bandwidth that is used to send the data in the first subband, information about the subcarrier spacing of the first subband, and information about the start frequency location at which the subcarrier mapping is performed in the first subband.

Optionally, the receiving unit is further configured to receive information about a filter number of the first subband from the network device, and determine the filter based on the information about the filter number.

Optionally, if the data is an uplink signal, the sending apparatus further includes a receiving unit, configured to receive, from a network device, the data bandwidth that is used to send the data in the first subband, the start frequency location at which the subcarrier mapping is performed in the first subband, and a type or a number of the first subband, where the type or the number of the first subband is used to determine the subcarrier spacing of the first subband.

Optionally, the determined frequency location of the subcarrier includes a location of a zero frequency.

Optionally, the sent signal may be expressed by using the following formula:

$$s(t) = \sum_n \sum_{k=k_n}^{k_n+N_n^{SC}-1} a_{n,k-k_n} \cdot e^{j2\pi k \Delta f_n(t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP length of the subband n, $f_n(t)$ represents a subband filter of the subband n, $e^{j2\pi k \Delta f_n(t-N_{CP,n}T_s)}$ represents an inverse Fourier transformation factor, $T_s$ is a sampling time interval, and $\otimes$ represents a convolution operation.

According to a sixth aspect, a sending apparatus is provided, including: a bus, and a processor, a memory, and a transceiver that are separately connected to the bus.

The memory is configured to store an instruction.

The processor is configured to execute the instruction stored in the memory, so as to perform the following steps when executing the instruction:

obtaining to-be-sent frequency domain data; determining a first subband for transmitting the data, where a subcarrier spacing of the first subband is an integral multiple of a basic frequency spacing; performing subcarrier mapping in the first subband for the data, where a subcarrier that is used to perform the subcarrier mapping is a subcarrier that is in the determined subband and located at a frequency that is an integral multiple of the subcarrier spacing of the subband, and frequency locations of subcarriers that are used to perform subcarrier mapping in different subbands do not overlap with each other; performing inverse fast Fourier transformation (IFFT) on the subcarrier obtained after the subcarrier mapping, to obtain a time domain signal; performing an operation of adding a cyclic prefix on the time domain signal; and filtering, by using a filter, the signal to which the cyclic prefix has been added; and sending the filtered signal by using the transceiver.

Optionally, the sending device is configured to perform the method in the fourth aspect. For related content, refer to the fourth aspect.

According to a seventh aspect, a receiving method is provided, including:

receiving signals that include data carried in different subbands;

performing subband filtering on the received signals, to obtain a signal of a first subband in which data of a terminal device resides;

removing a cyclic prefix from the signal of the first subband;

performing FFT (fast Fourier transformation) on the signal from which the cyclic prefix has been removed, to obtain a frequency domain signal;

extracting, at a frequency location at which subcarrier mapping is performed in the first subband for the data of the terminal device, frequency domain data of the terminal device from the frequency domain signal, where the frequency location is a location of a frequency that is an integral multiple of a subcarrier spacing of the first subband, the subcarrier spacing of the subband is an integral multiple of a basic frequency spacing, and frequency locations of subcarriers that are used to perform subcarrier mapping in different subbands do not overlap with each other; and performing signal detection on the extracted frequency domain data, to restore the data of the terminal device.

Optionally, the method further includes: determining data bandwidth that is used to send the data of the terminal device in the first subband, the subcarrier spacing of the first subband, and a start frequency location at which the mapping is performed in the first subband; and determining, based on the data bandwidth, the subcarrier spacing of the first subband, and the start frequency location, the frequency location at which the subcarrier mapping is performed in the first subband for the data of the terminal device.

Optionally, if the signal is a downlink signal, the method further includes: receiving, from a network device, information about the data bandwidth that is used to send the data in the first subband, information about the start frequency location at which the mapping is performed in the first subband, and information about the subcarrier spacing of the first subband.

Optionally, the method further includes: receiving information about a filter number from the network device.

Optionally, if the signal is a downlink signal, the method further includes: receiving, from a network device, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location does not include a location of a zero frequency.

Optionally, if the signal is an uplink signal, the method further includes: sending, to the terminal device, information about the data bandwidth that is used to send the data in the first subband, information about the subcarrier spacing of the first subband, and information about the start frequency location at which the subcarrier mapping is performed in the first subband.

Optionally, the method further includes: sending information about a filter number of the first subband to the terminal device, and determining a filter based on the information about the filter number.

Optionally, if the signal is an uplink signal, the method further includes: sending, to the terminal device, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location of the subcarrier includes a location of a zero frequency.

In the technical solution provided in the seventh aspect, the foregoing configuration relationship between subbands is implemented through IFFT transformation, and no extra spectrum shift operation needs to be performed, thereby reducing implementation complexity.

According to an eighth aspect, a receiving apparatus is provided, including:

a receiving unit, configured to receive signals that include data carried in different subbands;

a processing unit, configured to: perform subband filtering on the received signals, to obtain a signal of a first subband in which data of a terminal device resides; remove a cyclic prefix from the signal of the first subband; perform FFT (fast Fourier transformation) on the signal from which the cyclic prefix has been removed, to obtain a frequency domain signal; extract, at a frequency location at which subcarrier mapping is performed in the first subband for the data of the terminal device, frequency domain data of the terminal device from the frequency domain signal, where the frequency location is a location of a frequency that is an integral multiple of a subcarrier spacing of the first subband, the subcarrier spacing of the subband is an integral multiple of a basic frequency spacing, and frequency locations of subcarriers that are used to perform subcarrier mapping in different subbands do not overlap with each other; and perform signal detection on the extracted frequency domain data, to restore the data of the terminal device.

Optionally, the processing unit is further configured to: determine data bandwidth that is used to send the data of the terminal device in the first subband, the subcarrier spacing of the first subband, and a start frequency location at which the mapping is performed in the first subband; and determine, based on the data bandwidth, the subcarrier spacing of the first subband, and the start frequency location, the frequency location at which the subcarrier mapping is performed in the first subband for the data of the terminal device.

Optionally, if the signal is a downlink signal, the receiving unit is further configured to: receive, from a network device, information about the data bandwidth that is used to send the data in the first subband, information about the start frequency location at which the mapping is performed in the first subband, and information about the subcarrier spacing of the first subband.

Optionally, the receiving unit receives information about a filter number from the network device.

Optionally, if the signal is a downlink signal, the receiving unit receives, from a network device, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location does not include a location of a zero frequency.

Optionally, if the data is an uplink signal, the receiving apparatus further includes a sending unit, configured to send, to the terminal device, information about the data bandwidth that is used to send the data in the first subband, information about the subcarrier spacing of the first subband, and information about the start frequency location at which the subcarrier mapping is performed in the first subband.

Optionally, the sending unit is further configured to send, to the terminal device, information about data bandwidth that is used to send the data in the first subband, information about the subcarrier spacing of the first subband, and information about a start frequency location at which the subcarrier mapping is performed in the first subband.

Optionally, if the data is an uplink signal, the receiving apparatus further includes a sending unit, configured to send, to the terminal device, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location of the subcarrier includes a location of a zero frequency.

According to a ninth aspect, a receiving apparatus is provided, including: a bus, and a processor, a memory, and a transceiver that are separately connected to the bus.

The memory is configured to store an instruction.

The processor is configured to execute the instruction stored in the memory, so as to perform the following steps when executing the instruction:

receiving, by using the transceiver, signals that include data carried in different subbands; performing subband filtering on the received signals, to obtain a signal of a first subband in which data of a terminal device resides; removing a cyclic prefix from the signal of the first subband; performing FFT (fast Fourier transformation) on the signal from which the cyclic prefix has been removed, to obtain a frequency domain signal; extracting, at a frequency location at which subcarrier mapping is performed in the first subband for the data of the terminal device, frequency domain data of the terminal device from the frequency domain signal, where the frequency location is a location of a frequency that is an integral multiple of a subcarrier spacing of the first subband, the subcarrier spacing of the subband is an integral multiple of a basic frequency spacing, and frequency locations of subcarriers that are used to perform subcarrier mapping in different subbands do not overlap with each other; and performing signal detection on the extracted frequency domain data, to restore the data of the terminal device.

Optionally, the receiving device is configured to perform the method in the seventh aspect. For related content, refer to the seventh aspect.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and persons of ordinary skill in the art may derive other drawings from these accompanying drawings without creative efforts.

DETAILED DESCRIPTION

Figure 1:
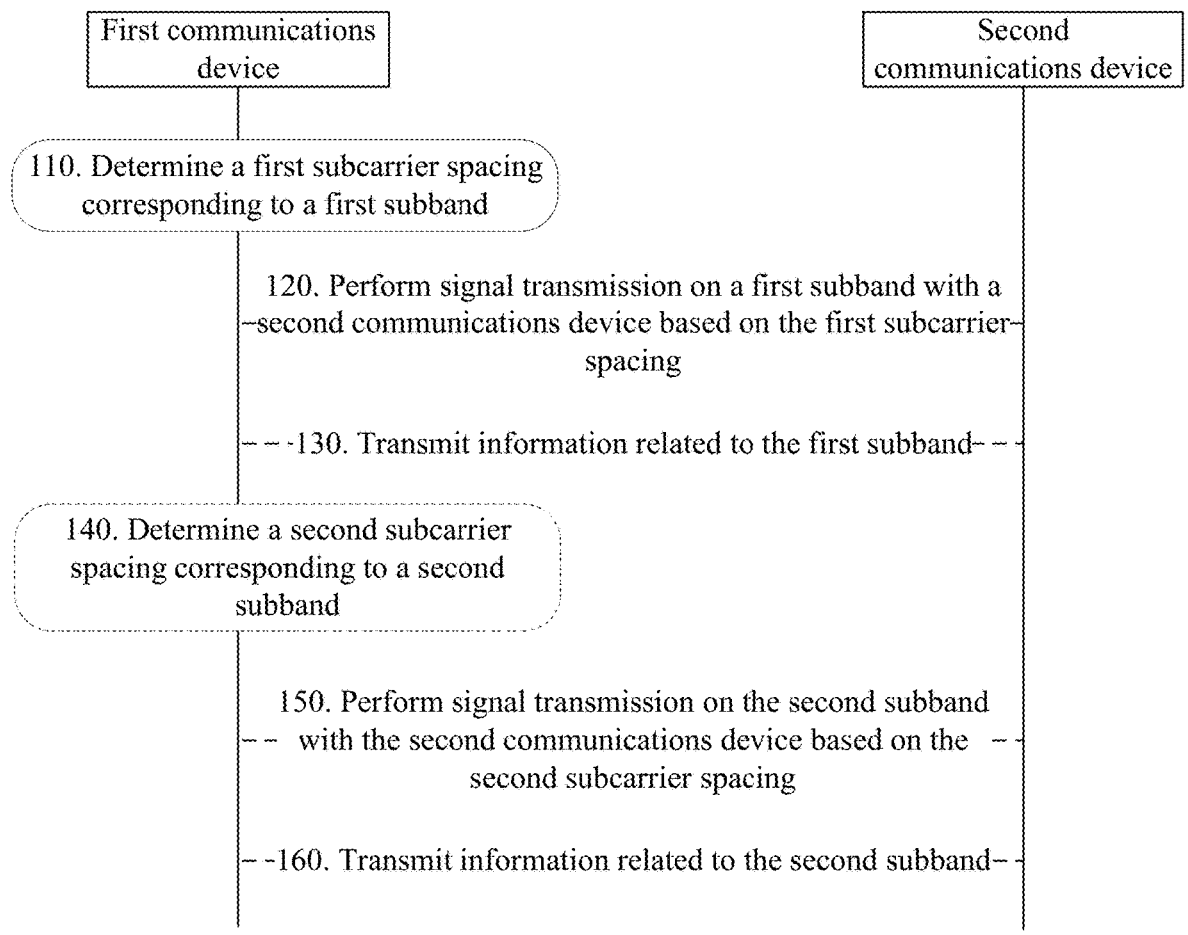
FIG. 1 is a schematic flowchart of a communication method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

It should be understood that the technical solutions in the embodiments of the present disclosure may be applied to various communications systems, for example: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and a future 5G system.

In a communications system applied in the embodiments of the present disclosure, a communications device includes a terminal device or a network device. The terminal device may communicate with one or more core networks by using a radio access network (RAN). The terminal device may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device or a computing device having a wireless communication function, another processing device connected to a wireless modem, an in-vehicle device, a wearable device, a terminal device in a future 5G network, or the like.

The network device may be a device configured to communicate with the terminal device. For example, the network device may be a base transceiver station (BTS) in a GSM system or a CDMA system, or may be a NodeB NB) in a WCDMA system, or may be an evolved NodeB (eNB or eNodeB) in an LTE system. Alternatively, the network device may be a relay station, an access point, an in-vehicle device, a wearable device, a network-side device in a future 5G network, a network device in a future evolved PLMN network, or the like.

In an F-OFDM solution in the embodiments of the present disclosure, a frequency spectrum is divided into a plurality of subbands, and parameters (numerology) of all subbands are different. A parameter of a subband includes at least one of parameters such as subcarrier bandwidth, a transmission time interval (TTI) length, a symbol length, a quantity of symbols, and a cyclic prefix (CP) length. The parameter of a subband may be preconfigured, or may be flexibly adapted based on a service load status. Generally, a subband of each parameter configuration is suitable for some specific service types. For example, a conventional voice/video, the Internet of Things (IoT), the real-time Internet of Vehicles, and a multimedia broadcast multicast service (MBMS) are separately distributed in specific subbands. A subband configuration of the IoT service has narrow subcarrier bandwidth and a relatively large transmission delay. This is of great significance to an IoT device with low power consumption and high-density distribution. In comparison, a subband configuration of the real-time Internet of Vehicles service has largest subcarrier bandwidth and a smallest transmission delay.

With development of smartphone technologies, applications on a terminal become increasingly diversified and complex. In addition to conventional voice/video and social networking services, a terminal game service and various sensor services emerge one after another. These services are usually concurrently performed. For example, a particular real-time sensor keeps performing detection in a background and sending signals by using a mobile network, while a user may be in a video chat in a foreground. In this case, the terminal device and the network device may transmit a plurality of types of service packets by using a plurality of F-OFDM subbands, respectively.

As viewed from principles of the F-OFDM technology, a location relationship between subbands may be any relationship, but different methods have different complexity in terms of signal processing and protocol processes. An objective of the present disclosure is to provide a subband signal generation manner and clarify the location relationship between subbands, so that signal processing and a protocol process can be implemented in a relatively simple manner.

Before the embodiments are described, the following restrictions are imposed on characteristics of a subband and the location relationships between subbands:

(1) System bandwidth is divided into subbands, and different subbands have different subcarrier spacings. Alternatively:

(2) Different subcarrier spacings are integral multiples of a basic frequency spacing. Optionally, the basic frequency spacing may be a minimum subcarrier spacing in different subcarrier spacings, or may be a value that is smaller than the minimum subcarrier spacing and that is divisible by the minimum subcarrier spacing. For example, assuming that two subcarrier spacings: 15 kHz and 30 kHz are allowed in a system, the basic frequency spacing may be 15 kHz; or assuming that two subcarrier spacings: 15 kHz and 22.5 kHz are allowed in a system, the basic frequency spacing may be 7.5 kHz. Alternatively:

(3) A frequency spacing between center frequencies of any two subbands is an integral multiple of the basic frequency spacing, or a frequency spacing between center frequencies of any two subbands is an integral multiple of the basic frequency spacing, or is an integral multiple of the minimum subcarrier spacing in the different subcarrier spacings.

A magnitude of the basic frequency spacing may be stipulated in a standard and preset in a communications device, for example, separately set in the network device and the terminal device; or may be preset in the network device or determined by the network device, and then notified by the network device to the terminal device.

Based on the foregoing restrictions on the relationship between subbands, parameters related to a resource and a subband may be expressed by using the basic frequency spacing.

Assuming that the basic frequency spacing is $\Delta f$ and the system bandwidth is $B_{system}$, the system bandwidth may be expressed by using basic frequency spacings as follows:

$$B_{system} = K_{system} \Delta f$$

In addition, the foregoing formula also indicates that system frequency resources may be numbered at a spacing of $\Delta f$ in ascending or descending order of frequencies, and a value range of the numbers is $[0, K_{system}-1]$. In this case, bandwidth of each subband, a center frequency of each subband, a subcarrier spacing of each subband, and a guard band may be expressed by using $\Delta f$ and a frequency resource number.

Subcarrier Spacing

The subcarrier spacing of each subband is an integral multiple of $\Delta f$. A subcarrier spacing of an $i^{th}$ subband is as follows:

$$f_i = M_i \Delta f$$

where $M_i$ is a positive integer, and relatively typical values are 1, 2, 4, 6, and the like.

Subband Bandwidth

Bandwidth $B_i$ of the $i^{th}$ subband may be expressed as follows:

$$B_i = K_i \Delta f = N_i f_i$$

where $K_i$ and $N_i$ both are positive integers and not greater than $K_{system}$, and $K_i = M_i N_i$.

Subband Center Frequency

Assuming that a numbering rule of the system frequency resources is in ascending order of frequencies, a center frequency $f_c(i)$ of the $i^{th}$ subband may be expressed as follows:

$$f_c(i) = f_{system}^{low} + L_i \Delta f$$

where $f_{system}^{low}$ represents a frequency corresponding to a system frequency resources number of a lowest frequency of the system bandwidth, $L_i$ represents a specific value of the system frequency resources number, and $L_i \in [0, K_{system}-1]$.

If a numbering rule is in descending order of frequencies, $f_c(i) = f_{system}^{high} + L_i \Delta f$, where $f_{system}^{high}$ represents a frequency corresponding to a system frequency resources number of a highest frequency of the system bandwidth, and $L_i$ is the same as the foregoing definition of $L_i$.

Guard Band

When necessary, a guard band may be set between two adjacent subbands. The guard band may also be expressed by using an integral multiple of the basic frequency spacing. Assuming that a frequency location of a high-frequency edge subcarrier of the $i^{th}$ subband is $T_i^{high} \Delta f$ and a frequency location of a low-frequency edge subcarrier of an $(i+1)^{th}$ subband is $T_{i+1}^{low} \Delta f$, a frequency spacing between the two frequency locations is a guard band. Obviously, when $\Delta f$ is determinate, the guard band may be determined by two positive integers $T_i^{high}$ and $T_{i+1}^{low}$.

According to the foregoing setting, when $\Delta f$ is determinate, various definitions of system frequency resources each may be expressed by using a positive integer not greater than $K_{system}$. A benefit of this includes the following: Concise definitions of frequency resources can be implemented, making a protocol simpler and more flexible.

In addition, the network device may indicate, by using relatively low overheads, a necessary parameter configuration to the terminal device. For example, only a value of a parameter such as, $K_{system}$, $M_i$, $K_i$, $N_i$, $F_{system}^{low}$, $f_{system}^{high}$, $L_i T_i^{high}$, or $T_{i+1}^{low}$ may be notified. Certainly, during implementation, parameters related to each subband, such as bandwidth of a subband and a subcarrier spacing of a subband, are stipulated in a standard, and the network device may determine, based on a type of a subband, related parameters corresponding to the subband. The terminal device receives type information of a subband that is sent by the network device, or the terminal device determines type information of a used subband based on a service type, and then the terminal device determines, based on a type of the subband, parameters related to the subband. In addition, bandwidth of the guard band between subbands may alternatively be a preset parameter, and the network device may not need to notify the terminal device of a bandwidth parameter of the guard band between subbands.

If the network device needs to notify the terminal device of a related frequency resource configuration, after accessing a system, the terminal device may obtain a frequency resource configuration of each cell by reading a system message. The resource configuration includes all or some of the foregoing parameters: the system bandwidth, the subcarrier spacing of each subband, the bandwidth of each subband, the center frequency of each subband, and the guard band. These parameters each are expressed by using the basic frequency spacing $\Delta f$ and a positive integer not greater than $K_{system}$.

It needs to be noted that future terminal devices may still have different capabilities, just as they do at present. Therefore, not all terminal devices are capable of processing signals of all subbands. For this reason, the network device may send only necessary configuration information instead of all configuration information to a corresponding terminal device based on a capability of the terminal device.

When a subband configuration changes, for example, when bandwidth of a subband i decreases but bandwidth of a subband i+1 increases, the network device needs to send only a changed parameter in the foregoing parameter configuration to the terminal device.

All or some of the foregoing assumptions may be met. Based on the foregoing assumptions, an embodiment of the present disclosure provides a communication method. As shown in FIG. 1, a communications device in FIG. 1 may be a network device or a terminal device. If a first communications device is a network device, a second communications device is a terminal device. If the first communications device is a terminal device, the second communications device is a network device. In this embodiment, a transmitted signal may be an uplink signal, or may be a downlink signal.

The method includes the following steps.

110. The first communications device determines a first subcarrier spacing corresponding to a first subband.

If the first communications device is a network device, the network device determines, based on a type of the first subband, the first subcarrier spacing corresponding to the first subband. If the first communications device is a terminal device, the terminal device may determine, based on related information of the first subband that is sent by a network device, the first subcarrier spacing corresponding to the first subband; or the terminal device determines, based on a type of the first subband, the first subcarrier spacing corresponding to the first subband. Bandwidth of the first subband is an integral multiple of a basic frequency spacing, and the first subcarrier spacing is an integral multiple of the basic frequency spacing. For a related description of the basic frequency spacing, refer to the foregoing description. Details are not described herein again.

120. The first communications device performs signal transmission on the first subband with the second communications device based on the first subcarrier spacing.

If the first communications device is a network device and the second communications device is a terminal device, for a downlink signal, this step includes: sending, by the network device, a downlink signal on the first subband to the terminal device based on the first subcarrier spacing; and receiving, by the terminal device on the first subband, the downlink signal that is sent by the network device on the first subband based on the first subcarrier spacing.

If the first communications device is a network device and the second communications device is a terminal device, for an uplink signal, this step includes: sending, by the terminal device, an uplink signal on the first subband to the network device based on the first subcarrier spacing; and receiving, by the network device, on the first subband, the uplink signal that is sent by the terminal device on the first subband based on the first subcarrier spacing.

If the first communications device is a terminal device and the second communications device is a network device, for an uplink signal, this step includes: sending, by the terminal device, an uplink signal on the first subband to the network device based on the first subcarrier spacing; and receiving, by the network device, on the first subband, the uplink signal that is sent by the terminal device on the first subband based on the first subcarrier spacing.

If the first communications device is a terminal device and the second communications device is a network device, for a downlink signal, this step includes: sending, by the network device, a downlink signal on the first subband to the terminal device based on the first subcarrier spacing; and receiving, by the terminal device, on the first subband, the downlink signal that is sent by the network device on the first subband based on the first subcarrier spacing.

130. Optionally, the first communications device performs transmission of information related to the first subband with the second communications device.

This step includes: sending, by a network device, the information related to the first subband to a terminal device; and receiving, by the terminal device, the information related to the first subband from the network device. The information related to the first subband includes at least one of the following information: information about the bandwidth of the first subband, information about the first subcarrier spacing, information about a center frequency of the first subband, and type information of the first subband.

Optionally, the method further includes: sending, by the network device, information about system bandwidth or information about the basic frequency spacing; and receiving, by the terminal device, the information about the system bandwidth or the information about the basic frequency spacing from the network device.

A time at which this step is performed is not limited. This step may be performed before the step 110. For example, this step may be implemented as described previously: obtaining, by the terminal device after accessing a system, a frequency resource configuration of each cell by reading a system message. In addition, when a subband configuration changes subsequently, the network device further sends a changed parameter to the terminal.

Based on the foregoing assumptions about the basic frequency spacing, each of the information about the bandwidth of the first subband, the information about the first subcarrier spacing, the information about the center frequency of the first subband, and the information about the system bandwidth may be a parameter such as $K_{system}$, $M_i$, $K_i$, $N_i$, $F_{system}^{low}$, $f_{system}^{high}$, $L_i T_i^{high}$, or $T_{i+1}^{low}$.

During implementation, parameters related to each subband, such as bandwidth of a subband and a subcarrier spacing of a subband, are stipulated in a standard, and the network device may determine, based on a type of a subband, related parameters corresponding to the subband. The terminal device receives type information of a subband that is sent by the network device, or the terminal device determines type information of a used subband based on a service type, and then the terminal device determines, based on a type of the subband, parameters related to the subband. In addition, bandwidth of a guard band between subbands may alternatively be a preset parameter, and the network device may not need to notify the terminal device of a bandwidth parameter of the guard band between subbands. This step is not necessary if the network device and the terminal device can separately determine the parameters related to the subband. In other words, the information related to the first subband does not need to be transmitted between the first communications device and the second communications device.

140. Optionally, the first communications device determines a second subcarrier spacing corresponding to a second subband.

If the first communications device determines that the first communications device needs to perform signal transmission on the second subband with the second communications device, the first communications device determines the second subcarrier spacing corresponding to the second subband. Bandwidth of the second subband is an integral multiple of the basic frequency spacing, and the second subcarrier spacing is an integral multiple of the basic frequency spacing. The first subcarrier spacing and the second subcarrier spacing are different from each other. This step is similar to step 110. For details, refer to step 110. Details are not described herein again.

Optionally, a frequency spacing between a center frequency of the first subband and a center frequency of the second subband is an integral multiple of the basic frequency spacing.

Optionally, if the first subband is adjacent to the second subband, bandwidth of a guard band between the first subband and the second subband is an integral multiple of the basic frequency spacing.

150. Optionally, the first communications device performs signal transmission on the second subband with the second communications device based on the second subcarrier spacing.

This step is similar to step 120. For details, refer to step 120. Details are not described herein again.

160. Optionally, the first communications device performs transmission of information related to the second subband with the second communications device.

This step is similar to step 130. For details, refer to step 130. Details are not described herein again. Alternatively this step and step 130 may be combined into a same step, to simultaneously obtain related information of different subbands in one process.

In this embodiment of the present disclosure, parameters of frequency resources each are expressed by using a basic frequency spacing Δf and a positive integer not greater than $K_{system}$, making a protocol simpler and more flexible. In addition, frequency resource configuration parameters each are expressed by using the basic frequency spacing Δf and a positive integer not greater than $K_{system}$, and the network device may indicate, by using relatively low overheads, a necessary parameter configuration to the terminal device. Furthermore, a location relationship between subbands is clarified, so that signal processing and a protocol process can be implemented in a relatively simple manner.

Figure 2:
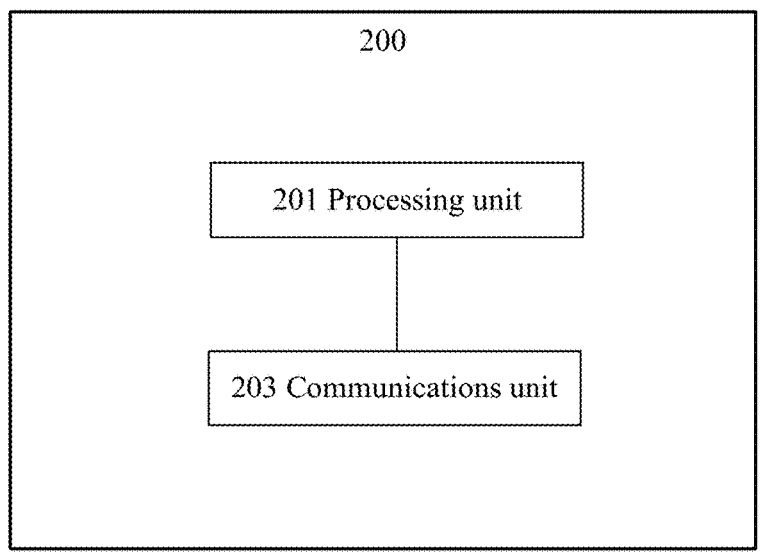
FIG. 2 is a schematic structural diagram of a communications device according to an embodiment of the present disclosure.

Based on a same idea, an embodiment of the present disclosure provides a communications device 200, configured to perform the communication method embodiment of the present disclosure. For related content, refer to the method description. Details are not described herein again. The communications device provided in this embodiment of the present disclosure communicates with another communications device. As shown in FIG. 2:

The communications device 200 includes: a processing unit 201 and a communications unit 203. The communications unit 203 may be specifically a transceiver.

The processing unit 201 is configured to determine a first subcarrier spacing corresponding to a first subband; and the communications unit 203 is configured to perform signal transmission on the first subband with a second communications device based on the first subcarrier spacing; or the processing unit 201 is configured to determine a second subcarrier spacing corresponding to a second subband; and the communications unit 203 is configured to perform signal transmission on the second subband with a second communications device based on the second subcarrier spacing.

The first subcarrier spacing is different from the second subcarrier spacing, and both the first subcarrier spacing and the second subcarrier spacing are integral multiples of a basic frequency spacing; and both bandwidth of the first subband and bandwidth of the second subband are integral multiples of the basic frequency spacing.

For description of the basic frequency spacing, a frequency spacing between a center frequency of the first subband and a center frequency of the second subband, bandwidth of a guard band between the first subband and the second subband, and resource related parameters, refer to the foregoing description. Details are not described herein again.

Optionally, if the communications device 200 is a network device, the communications unit 201 is further configured to send at least one of the following information: information about system bandwidth, information about the first subband, information about the second subband, and information about the bandwidth of the guard band between the first subband and the second subband.

Optionally, if the communications device 200 is a terminal device, the communications unit 201 is further configured to receive at least one of the following information: information about system bandwidth, information about the first subband, information about the second subband, and information about the bandwidth of the guard band between the first subband and the second subband.

Optionally, the processing unit 201 is specifically configured to: determine the first subcarrier spacing based on the received information about the first subband; or determine the second subcarrier spacing based on the received information about the second subband.

For the information about the first subband and the information about the second subband, refer to the foregoing method description. Details are not described herein again.

In this embodiment of the present disclosure, parameters of frequency resources each are expressed by using a basic frequency spacing Δf and a positive integer not greater than $K_{system}$, making a protocol simpler and more flexible. In addition, frequency resource configuration parameters each are expressed by using the basic frequency spacing Δf and a positive integer not greater than $K_{system}$, and the network device may indicate, by using relatively low overheads, a necessary parameter configuration to the terminal device. Furthermore, a location relationship between subbands is clarified, so that signal processing and a protocol process can be implemented in a relatively simple manner.

Figure 3:
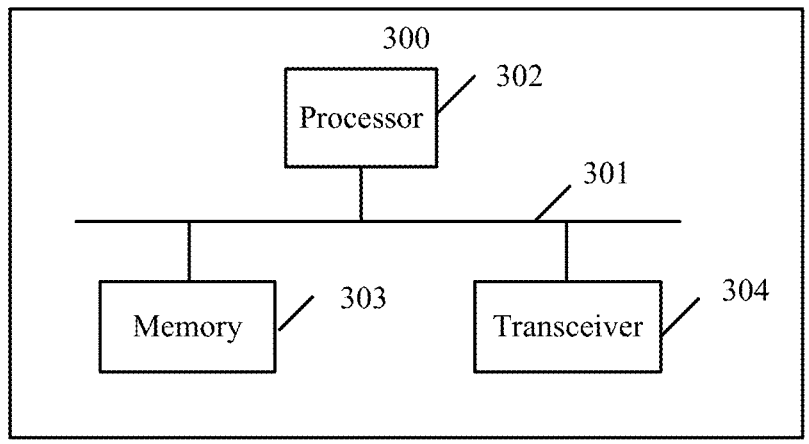
FIG. 3 is a schematic structural diagram of another communications device according to an embodiment of the present disclosure.

Based on a same technical idea, an embodiment of the present disclosure provides a communications device 300, configured to perform the method in the embodiments of the present disclosure. For related content, refer to the method description. Details are not described herein again. As shown in FIG. 3, the device 300 includes: a bus 301, and a processor 302, a memory 303, and a transceiver 304 that are separately connected to the bus 301. The transceiver 304 may include a receiver and a transmitter.

The transceiver 304 is configured to communicate with another communications device.

The memory 303 is configured to store an instruction.

The processor 302 is configured to execute the instruction stored in the memory 303, so as to perform the following steps when executing the instruction:

determining a first subcarrier spacing corresponding to a first subband; and performing signal transmission on the first subband with a second communications device by using the transceiver 304 based on the first subcarrier spacing; or determining a second subcarrier spacing corresponding to a second subband; and performing signal transmission on the second subband with a second communications device by using the transceiver 304 based on the second subcarrier spacing.

The first subcarrier spacing is different from the second subcarrier spacing, and both the first subcarrier spacing and the second subcarrier spacing are integral multiples of a basic frequency spacing; and both bandwidth of the first subband and bandwidth of the second subband are integral multiples of the basic frequency spacing.

For description of the basic frequency spacing, a frequency spacing between a center frequency of the first subband and a center frequency of the second subband, bandwidth of a guard band between the first subband and the second subband, and resource related parameters, refer to the foregoing description. Details are not described herein again.

Optionally, if the first communications device is a network device, the processor 302 further performs the following step when executing the instruction: sending at least one of the following information by using the transceiver: information about system bandwidth, information about the first subband, information about the second subband, and information about the bandwidth of the guard band between the first subband and the second subband.

Optionally, if the first communications device is a terminal device, the processor 302 further performs the following step when executing the instruction: receiving at least one of the following information by using the transceiver: information about system bandwidth, information about the first subband, information about the second subband, and information about the bandwidth of the guard band between the first subband and the second subband.

Optionally, the processor 302 specifically performs the following step when executing the instruction: determining the first subcarrier spacing based on the received information about the first subband; or determining the second subcarrier spacing based on the received information about the second subband.

For the information about the first subband and the information about the second subband, refer to the foregoing method description. Details are not described herein again.

In this embodiment of the present disclosure, parameters of frequency resources each are expressed by using a basic frequency spacing $\Delta f$ and a positive integer not greater than $K_{system}$, making a protocol simpler and more flexible. In addition, frequency resource configuration parameters each are expressed by using the basic frequency spacing $\Delta f$ and a positive integer not greater than $K_{system}$, and the network device may indicate, by using relatively low overheads, a necessary parameter configuration to the terminal device. Furthermore, a location relationship between subbands is clarified, so that signal processing and a protocol process can be implemented in a relatively simple manner.

Based on the foregoing assumptions, an embodiment of the present disclosure provides a signal sending method. The method is performed by a communications device. The communications device may be a network device or a terminal device. In this embodiment, a transmitted signal may be an uplink signal, or may be a downlink signal. A general solution in this embodiment includes: first, setting a basic frequency spacing, where a subcarrier spacing of each F-OFDM subband is set to an integral multiple of the basic frequency spacing; generating to-be-sent frequency domain data of each subband, and separately mapping the to-be-sent data of each subband to integral-multiple subcarrier frequencies corresponding to the subband; and then performing an IFFT transformation operation, an operation of adding a cyclic prefix, and a filtering operation on each subband, to obtain corresponding time-domain data, and then adding up and merging the obtained time-domain data.

Figure 4:
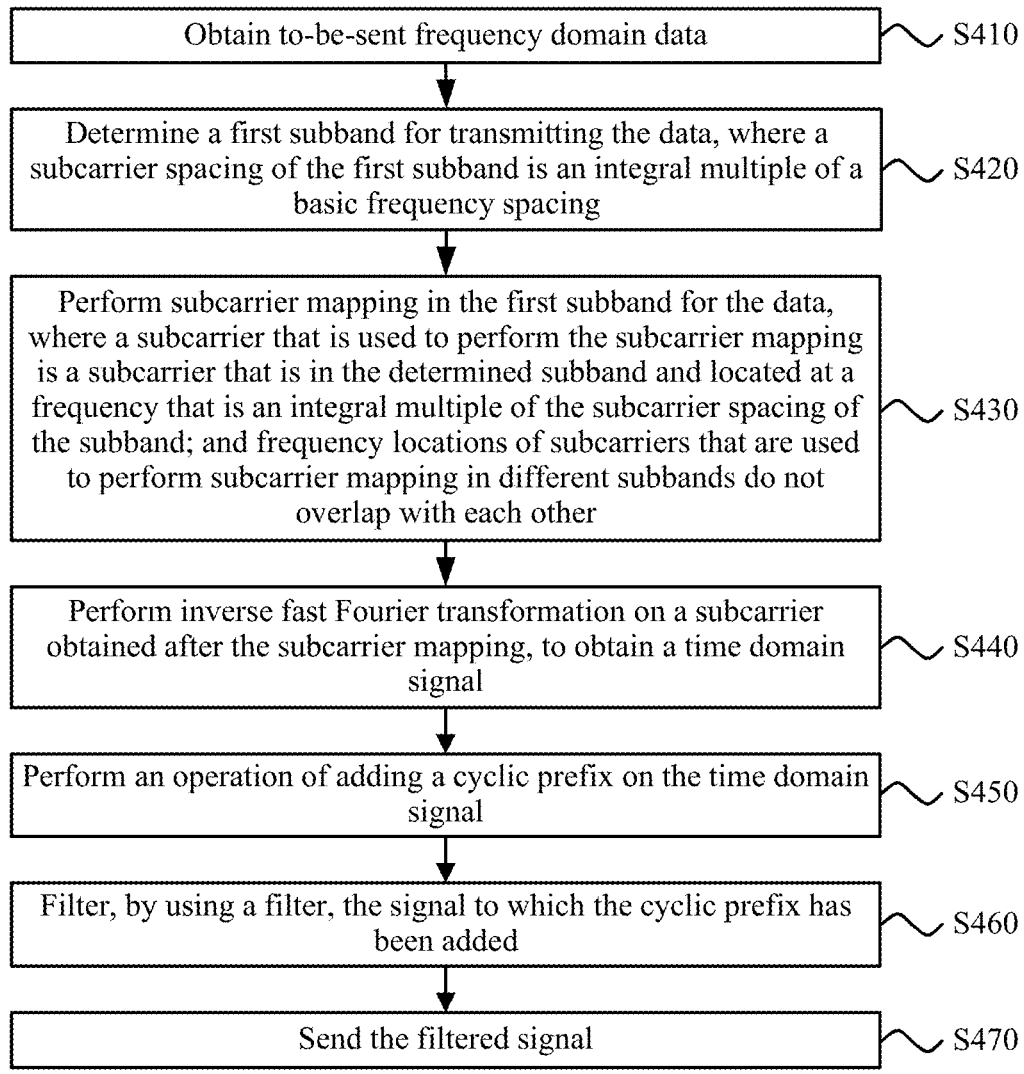
FIG. 4 is a schematic flowchart of a signal sending method according to an embodiment of the present disclosure.

As shown in FIG. 4, the method includes the following steps.

410. Obtain to-be-sent frequency domain data.

420. Determine a first subband for transmitting the data, where a subcarrier spacing of the first subband is an integral multiple of a basic frequency spacing.

For definitions of the subcarrier spacing and the basic frequency spacing, refer to the foregoing related descriptions. Details are not described herein again.

For example, assuming that subcarrier spacings of two adjacent subbands N and N+1 in a system are respectively 7.5 kHz and 15 kHz and their subband widths are both 60 kHz, a quantity of sub carriers of the subband N and a quantity of sub carriers of the subband N+1 are 8 and 4, respectively.

430. Perform subcarrier mapping in the first subband for the data, where a subcarrier that is used to perform the subcarrier mapping is a subcarrier that is in the determined subband and located at a frequency that is an integral multiple of the subcarrier spacing of the subband, and frequency locations of subcarriers that are used to perform subcarrier mapping in different subbands do not overlap with each other.

Figure 5:
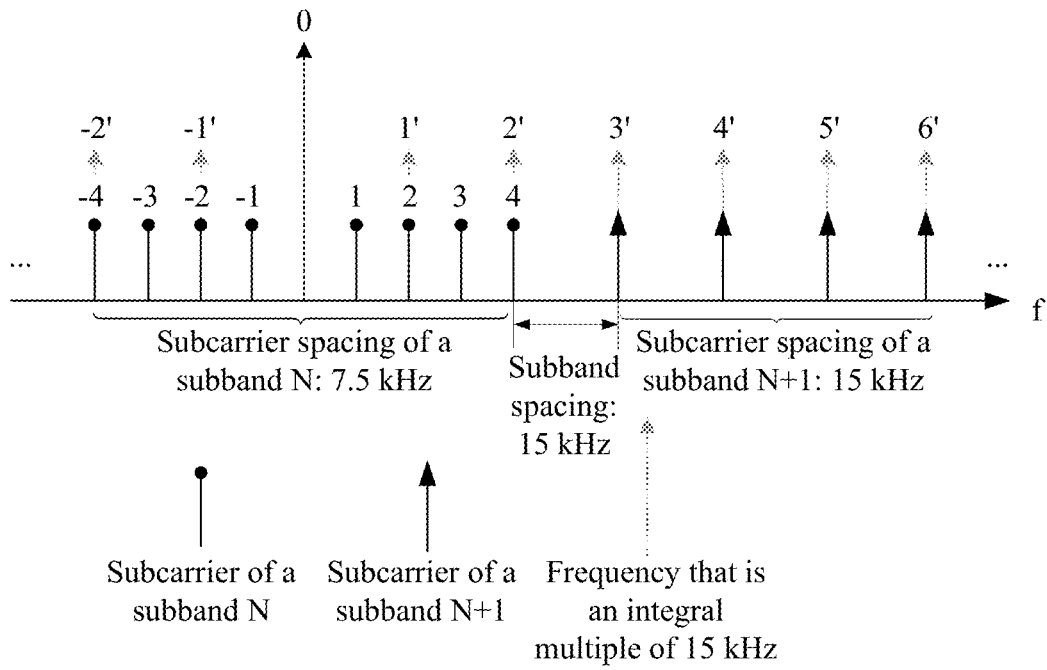
FIG. 5 is a schematic diagram of mapping subcarriers of F-OFDM subbands (where a subband N is symmetrical about a zero frequency) according to an embodiment of the present disclosure.

For example, a subcarrier mapping method of F-OFDM is described by using the foregoing two adjacent subbands N and N+1 in the system as an example. It is assumed that a frequency spectrum of the subband N passes through a zero frequency, and is distributed symmetrically about the zero frequency; or may be distributed asymmetrically about the zero frequency, where a subcarrier mapping manner is similar to that of symmetrical distribution and is described later. A frequency spectrum of the subband N+1 does not pass through the zero frequency. There are only two cases for a location of a frequency spectrum in subband mapping in the system: The frequency spectrum passes through the zero frequency, or does not pass through the zero frequency. Therefore, the subband N and the subband N+1 can represent all subbands in the system. First, the subband N is mapped. Eight subcarriers are evenly distributed on left and right sides of the zero frequency. A start subcarrier mapping number is −4. Eight to-be-sent frequency domain data symbols of the subband are mapped sequentially to subcarrier locations whose frequencies are integral multiples of 7.5 kHz. As shown by black dots in FIG. 5, no data is mapped to a subcarrier of the zero frequency. In this way, numbers of subcarriers to which the data is mapped are −4, −3, −2, −1, 1, 2, 3, and 4 (where the numbers are internal subcarrier numbers of the subband N, and respectively represent frequency domain locations −30 kHz, −22.5 kHz, −15 kHz, −7.5 kHz, 7.5 kHz, 15 kHz, 22.5 kHz, and 30 kHz). Then, four subcarriers of the subband N+1 are mapped. Two conditions need to be met for the mapping: One is that the data needs to be mapped to frequencies (as shown by gray dotted arrows in FIG. 5) that are integral multiples of 15 kHz, and the other is that mapped frequency locations cannot overlap with subcarrier locations of another subband. In this way, a smallest subcarrier number for the mapping of the subband N+1 can start only from 3' (This is because a location of a subcarrier 1' and a location of a subcarrier 2' of the subband N+1 respectively overlap a location of a subcarrier 2 and a location of a subcarrier 4 of the subband N, as shown in FIG. 5 It is noted that 1', 2', 3', . . . are internal subcarrier numbers of the subband N+1, and should not be confused with the internal subcarrier numbers 1, 2, 3, . . . of the subband N.). Four to-be-sent frequency domain data symbols of the subband N+1 are mapped consecutively to subcarrier locations (as indicated by black solid arrows in FIG. 5) whose frequencies are integral multiples of 15 kHz. Subcarrier mapping numbers are 3', 4', 5', and 6' (respectively representing frequency domain locations: 45 kHz, 60 kHz, 75 kHz, and 90 kHz). A spacing between the subband N and the subband N+1 is 15 kHz. It needs to be noted that a start subcarrier number in the mapping of the subband N+1 may alternatively be an integer greater than 3', so that the subband spacing is equal to an integral multiple of 15 kHz. On a precondition of ensuring that the subcarriers are mapped to frequencies that are integral multiples of a subcarrier spacing of a corresponding subband, a magnitude of the subband spacing may be determined based on a guard band that needs to be placed between subband filters (For brevity, only an example of 15 kHz is shown in FIG. 5).

Figure 6:
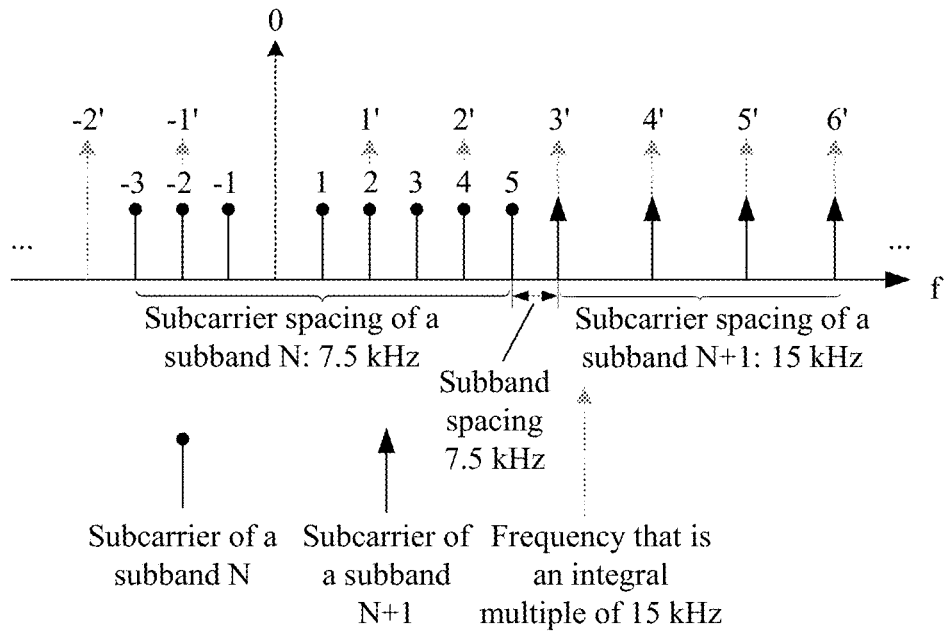
FIG. 6 is a schematic diagram of mapping subcarriers of F-OFDM subbands (where a subband N is asymmetrical about a zero frequency) according to an embodiment of the present disclosure.

If the subcarriers of the subband N are distributed asymmetrically about the zero frequency, as shown in FIG. 6, assuming that the subcarrier mapping numbers of the subband N are −3, −2, −1, 1, 2, 3, 4, and 5 (and actual mapping includes but is not limited to this manner), the subcarrier mapping numbers of the subband N+1 can still be 3', 4', 5', and 6'. In this case, the subband spacing is 7.5 kHz. Likewise, the subband spacing may be adjusted based on a guard band that needs to be placed between subband filters.

After the subcarrier mapping is completed, both the subband N and the subband N+1 are located at locations whose frequencies are integral multiples of the basic frequency spacing 7.5 kHz, and the spacing between the two subbands is an integral multiple of 7.5 kHz. A subsequent IFFT operation only needs to be separately performed for each subband. In this way, subcarrier mapping is separately performed for data of subbands that have different subcarrier spacings, and the data is directly mapped to frequencies that are integral multiples of a subcarrier spacing of a corresponding subband, thereby resolving a problem of non-integral-multiple subcarrier frequency mapping, to smoothly perform next IFFT transformation.

Optionally, the method further includes: determining data bandwidth that is used to send the data in the first subband, the subcarrier spacing of the first subband, and a start frequency location at which the mapping is performed in the first subband; and determining, based on the data bandwidth, the subcarrier spacing of the first subband, and the start frequency location, a frequency location of the subcarrier that is used to perform the subcarrier mapping.

440. Perform inverse fast Fourier transformation (IFFT) on the subcarrier obtained after the subcarrier mapping, to obtain a time domain signal.

One or more zeros are added on two sides of a data subcarrier based on an IFFT magnitude of each subband, to separately perform IFFT transformation. It is assumed that the system includes a plurality of subbands, and a system sampling rate determined based on total bandwidth is 15.36 MHz. For the subband N, an IFFT transformation magnitude is 15.36 MHz/7.5 kHz=2048; for the subband N+1, an IFFT transformation magnitude is 15.36 MHz/15 kHz=1024. In this way, each subband has a same sampling rate after IFFT transformation, to facilitate subsequent add-up and merging after filtering.

450. Perform an operation of adding a cyclic prefix on the time domain signal.

460. Filter, by using a filter, the signal to which the cyclic prefix has been added.

470. Send the filtered signal.

Optionally, filtered signals of subbands are merged. The sending the filtered signal includes: sending a merged signal.

This embodiment is intended to describe the signal processing method based on the basic settings of the present disclosure. A main advantage of the method is that, the foregoing configuration relationship between subbands is implemented through IFFT transformation, and no extra spectrum shift operation needs to be performed, thereby reducing implementation complexity.

Another embodiment of the present disclosure further provides a signal sending method. In this embodiment, a sent signal is a downlink signal. The method is performed by a network device. The network device sends the downlink signal to a terminal device.

A difference between this embodiment and the embodiment corresponding to FIG. 4 is as follows:

The method further includes: notifying, by the network device, the terminal device of information about the data bandwidth that is used to send the data in the first subband, information about the start frequency location at which the mapping is performed in the first subband, and information about the subcarrier spacing of the first subband. All information needing to be notified may be expressed by using a basic frequency spacing $\Delta f$ and a positive integer not greater than $K_{system}$. For details, refer to the foregoing related description. Details are not described herein again. Optionally, the method further includes: notifying, by the network device, the terminal device of a number of the filter; or notifying, by the network device, the terminal device of information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband. All information needing to be notified may be expressed by using a basic frequency spacing $\Delta f$ and a positive integer not greater than $K_{system}$. For details, refer to the foregoing related description. Details are not described herein again.

Optionally, the determined frequency location does not include a location of a zero frequency.

Optionally, the sent signal may be expressed by using the following formula:

$$s(t) =$$

$$\left( \sum_{k=k_0}^{-1} a_{0,k-k_0} \cdot e^{j2\pi k \Delta f_0 (t - N_{CP,0} T_s)} + \sum_{k=1}^{k_0 + N_0^{SC}} a_{0,k-k_0-1} \cdot e^{j2\pi k \Delta f_0 (t - N_{CP,0} T_s)} \right) \otimes$$

$$f_0(t) + \sum_{n \neq 0} \sum_{k=k_n}^{k_n + N_n^{SC} - 1} a_{n,k-k_n} \cdot e^{j2\pi k \Delta f_n (t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP (cyclic prefix) length of the subband n, $f_n(t)$ represents a subband filter of the subband n, $e^{j2\pi k \Delta f_n (t - N_{CP,n} T_s)}$ represents an inverse Fourier transformation factor, $T_s$ is a sampling time interval, and ⊗ represents a convolution operation.

Another embodiment of the present disclosure further provides a signal sending method. In this embodiment, a sent signal is an uplink signal. The method is performed by a terminal device. The terminal device sends the uplink signal to a network device.

A difference between this embodiment and the embodiment corresponding to FIG. 4 is as follows:

The method further includes: receiving, by the terminal device, from the network device, information about the data bandwidth that is used to send the data in the first subband, information about the subcarrier spacing of the first subband, and information about the start frequency location at which the subcarrier mapping is performed in the first subband. All the information may be expressed by using a basic frequency spacing $\Delta f$ and a positive integer not greater than $K_{system}$. For details, refer to the foregoing related description. Details are not described herein again. Optionally, the method further includes: receiving, by the terminal device, information about a number of the filter from the network device, and determining the filter based on the information about the filter number; or receiving, by the terminal device, from the network device, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband. All the information may be expressed by using a basic frequency spacing $\Delta f$ and a positive integer not greater than $K_{system}$. For details, refer to the foregoing related description. Details are not described herein again.

Optionally, the determined frequency location includes a location of a zero frequency.

Optionally, the sent signal may be expressed by using the following formula:

$$s(t) = \sum_{n} \sum_{k=k_n}^{k_n + N_n^{SC} - 1} a_{n,k-k_n} \cdot e^{j2\pi k \Delta f_n (t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP length of the subband n, $f_n(t)$ represents a subband filter of the subband n, $e^{j2\pi k \Delta f_n (t - N_{CP,n} T_s)}$ represents an inverse Fourier transformation factor, $T_s$ is a sampling time interval, and ⊗ represents a convolution operation.

Figure 7:
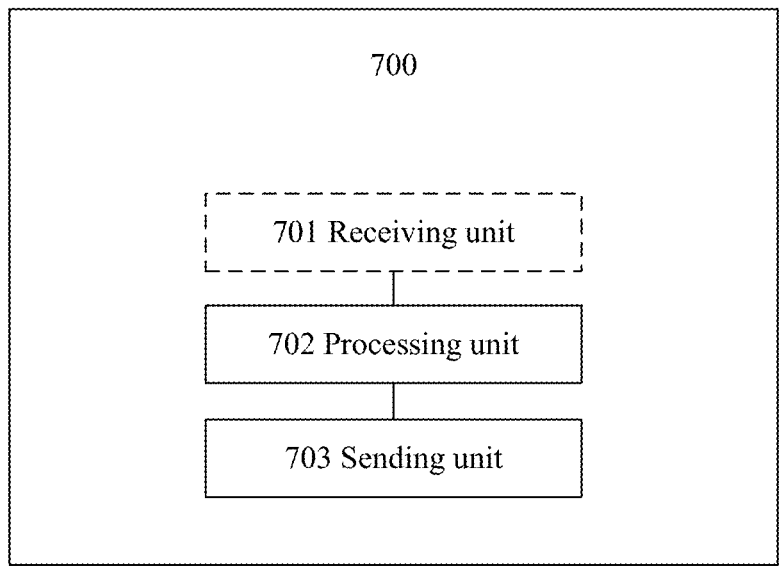
FIG. 7 is a schematic structural diagram of a sending device according to an embodiment of the present disclosure.

Based on a same idea, an embodiment of the present disclosure provides a sending device 700, configured to perform communication method embodiments of the present disclosure. For related content, refer to the method description. Details are not described herein again. The sending device 700 provided in this embodiment of the present disclosure communicates with another communications device. As shown in FIG. 7:

The sending device 700 includes: a processing unit 702 and a sending unit 703. The processing unit may be specifically a processor, and the sending unit may be specifically a transmitter.

The processing unit 702 is configured to: obtain to-be-sent frequency domain data; determine a first subband for transmitting the data, where a subcarrier spacing of the first subband is an integral multiple of a basic frequency spacing; perform subcarrier mapping in the first subband for the data, where a subcarrier that is used to perform the subcarrier mapping is a subcarrier that is in the determined subband and located at a frequency that is an integral multiple of the subcarrier spacing of the subband, and frequency locations of subcarriers that are used to perform subcarrier mapping in different subbands do not overlap with each other; perform inverse fast Fourier transformation (IFFT) on the subcarrier obtained after the subcarrier mapping, to obtain a time domain signal; perform an operation of adding a cyclic prefix on the time domain signal; and filter, by using a filter, the signal to which the cyclic prefix has been added.

The sending unit 703 is configured to send the filtered signal.

For description of related parameters such as the basic frequency spacing and a frequency spacing of a subcarrier spacing of a subband, refer to the foregoing description. Details are not described herein again.

Optionally, the processing unit is further configured to: determine data bandwidth that is used to send the data in the first subband, the subcarrier spacing of the first subband, and a start frequency location at which the mapping is performed in the first subband; and determine, based on the data bandwidth, the subcarrier spacing of the first subband, and the start frequency location, a frequency location of the subcarrier that is used to perform the subcarrier mapping. For parameters such as bandwidth of a subband and the frequency location of the subcarrier that is used to perform the subcarrier mapping, refer to the foregoing description. Details are not described herein again.

Optionally, the processing unit is further configured to merge filtered signals of subbands; and the sending unit is specifically configured to send a merged signal.

This embodiment is intended to describe the sending apparatus. A main advantage of the sending device is that, the foregoing configuration relationship between subbands is implemented through IFFT transformation, and no extra spectrum shift operation needs to be performed, thereby reducing implementation complexity.

Another embodiment of the present disclosure further provides a sending apparatus. In this embodiment, a sent signal is a downlink signal. The sending apparatus may be a network device. The network device is configured to send a downlink signal to a terminal device.

A difference between this embodiment and the embodiment corresponding to FIG. 7 is as follows:

The sending unit 703 is further configured to notify the terminal device of information about the data bandwidth that is used to send the data in the first subband, information about the start frequency location at which the mapping is performed in the first subband, and information about the subcarrier spacing of the first subband. Optionally, the sending unit 703 is further configured to notify the terminal device of information about a number of the filter; or the sending unit 703 is further configured to notify user equipment of information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location does not include a location of a zero frequency.

Optionally, the sent signal may be expressed by using the following formula:

$$s(t) = \left( \sum_{k=k_0}^{-1} a_{0,k-k_0} \cdot e^{j2\pi k \Delta f_0 (t - N_{CP,0} T_s)} + \sum_{k=1}^{k_0+N_0^{SC}} a_{0,k-k_0-1} \cdot e^{j2\pi k \Delta f_0 (t - N_{CP,0} T_s)} \right) \otimes f_0(t) + \sum_{n \neq 0} \sum_{k=k_n}^{k_n+N_n^{SC}-1} a_{n,k-k_n} \cdot e^{j2\pi k \Delta f_n (t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP (cyclic prefix) length of the subband n, $f_n(t)$ represents a subband filter of the subband n, $e^{j2\pi k \Delta f_n (t - N_{CP,n} T_s)}$ represents an inverse Fourier transformation factor, $T_s$ is a sampling time interval, and $\otimes$ represents a convolution operation.

Another embodiment of the present disclosure further provides a sending apparatus. In this embodiment, a sent signal is an uplink signal. The sending apparatus may be a terminal device. The terminal device is configured to send an uplink signal to a network device.

A difference between this embodiment and the embodiment corresponding to FIG. 7 is as follows:

The sending apparatus further includes a receiving unit 701. The receiving unit is configured to receive, from the network device, information about the data bandwidth that is used to send the data in the first subband, information about the subcarrier spacing of the first subband, and information about the start frequency location at which subcarrier mapping is performed in the first subband. Optionally, the receiving unit 701 is further configured to receive information about a filter number of the first subband from the network device, and determine the filter based on the information about the filter number; or the receiving unit is configured to receive, from the network device, the data bandwidth that is used to send the data in the first subband, the start frequency location at which the subcarrier mapping is performed in the first subband, and a type or a number of the first subband, where the type or the number of the first subband is used to determine the subcarrier spacing of the first subband.

Optionally, the determined frequency location of the subcarrier includes a location of a zero frequency.

Optionally, the sent signal may be expressed by using the following formula:

$$s(t) = \sum_{n} \sum_{k=k_n}^{k_n+N_n^{SC}-1} a_{n,k-k_n} \cdot e^{j2\pi k \Delta f_n (t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP length of the subband n, $f_n(t)$ represents a subband filter of the subband n, $e^{j2\pi k \Delta f_n (t - N_{CP,n} T_s)}$ represents an inverse Fourier transformation factor, $T_s$ is a sampling time interval, and $\otimes$ represents a convolution operation.

Figure 8:
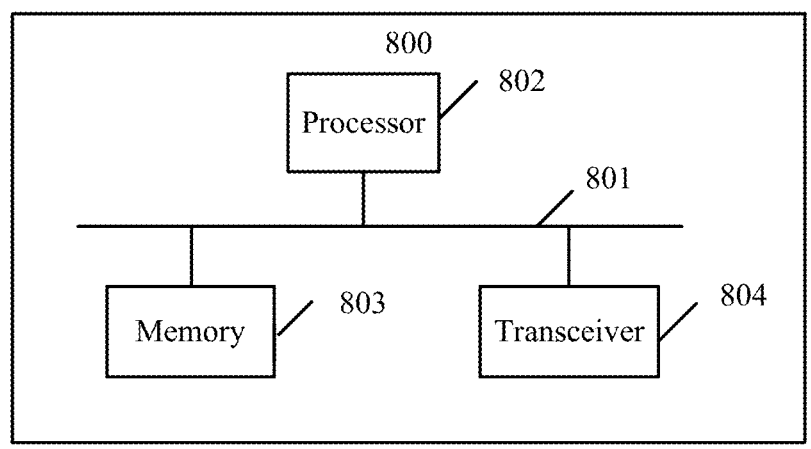
FIG. 8 is a schematic structural diagram of another sending device according to an embodiment of the present disclosure.

Based on a same technical idea, an embodiment of the present disclosure provides a sending device 800, configured to perform the method in the embodiments of the present disclosure. For related content, refer to the method description. Details are not described herein again. As shown in FIG. 8, the device 800 includes: a bus 801, and a processor 802, a memory 803, and a transceiver 804 that are separately connected to the bus 801. The transceiver 804 may include a receiver and a transmitter.

The transceiver 804 is configured to communicate with another receiving device.

The memory 803 is configured to store an instruction.

The processor 802 is configured to execute the instruction stored in the memory 803, so as to perform the following steps when executing the instruction:

obtaining to-be-sent frequency domain data; determining a first subband for transmitting the data, where a subcarrier spacing of the first subband is an integral multiple of a basic frequency spacing; performing subcarrier mapping in the first subband for the data, where a subcarrier that is used to perform the subcarrier mapping is a subcarrier that is in the determined subband and located at a frequency that is an integral multiple of the subcarrier spacing of the subband, and frequency locations of subcarriers that are used to perform subcarrier mapping in different subbands do not overlap with each other; performing inverse fast Fourier transformation (IFFT) on the subcarrier obtained after the subcarrier mapping, to obtain a time domain signal; performing an operation of adding a cyclic prefix on the time domain signal; and filtering, by using a filter, the signal to which the cyclic prefix has been added; and sending the filtered signal by using the transceiver.

For definitions of related parameters such as the subcarrier spacing and the basic frequency spacing, refer to the foregoing related descriptions. Details are not described herein again.

Optionally, the processor is further configured to perform the following steps when executing the instruction: determining data bandwidth that is used to send the data in the first subband, the subcarrier spacing of the first subband, and a start frequency location at which the mapping is performed in the first subband; and determining, based on the data bandwidth, the subcarrier spacing of the first subband, and the start frequency location, a frequency location of the subcarrier that is used to perform the subcarrier mapping.

Optionally, the processor is further configured to perform the following steps when executing the instruction: merging filtered signals of subbands, and sending a merged signal by using the transceiver.

This embodiment is intended to describe the sending apparatus. A main advantage of the sending device is that, the foregoing configuration relationship between subbands is implemented through IFFT transformation, and no extra spectrum shift operation needs to be performed, thereby reducing implementation complexity.

Another embodiment of the present disclosure further provides a sending apparatus. In this embodiment, a sent signal is a downlink signal. The sending apparatus may be a network device. The network device sends a downlink signal to a terminal device.

A difference between this embodiment and the embodiment corresponding to FIG. 8 is as follows:

The processor is further configured to perform the following step when executing the instruction: notifying, by using the transceiver, the terminal device of information about the data bandwidth that is used to send the data in the first subband, information about the start frequency location at which the mapping is performed in the first subband, and information about the subcarrier spacing of the first subband. Optionally, the processor is further configured to perform the following step when executing the instruction: notifying, by using the transceiver, the terminal device of information about a number of the filter; or the processor is further configured to perform the following step when executing the instruction: notifying, by using the transceiver, user equipment of information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location does not include a location of a zero frequency.

Optionally, the sent signal may be expressed by using the following formula:

$$s(t) = \left( \sum_{k=k_0}^{-1} a_{0,k-k_0} \cdot e^{j2\pi k \Delta f_0 (t - N_{CP,0} T_s)} + \sum_{k=1}^{k_0 + N_0^{SC}} a_{0,k-k_0-1} \cdot e^{j2\pi k \Delta f_0 (t - N_{CP,0} T_s)} \right) \otimes$$

$$f_0(t) + \sum_{n \neq 0} \sum_{k=k_n}^{k_n + N_n^{SC} - 1} a_{n,k-k_n} \cdot e^{j2\pi k \Delta f_n (t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP (cyclic prefix) length of the subband n, $f_n(t)$ represents a subband filter of the subband n, $e^{j2\pi k \Delta f_n (t - N_{CP,n} T_s)}$ represents an inverse Fourier transformation factor, $T_s$ is a sampling time interval, and $\otimes$ represents a convolution operation.

Another embodiment of the present disclosure further provides a sending apparatus. In this embodiment, a sent signal is an uplink signal. The sending apparatus may be a terminal device. The terminal device sends an uplink signal to a network device.

A difference between this embodiment and the embodiment corresponding to FIG. 8 is as follows:

The processor is further configured to perform the following step when executing the instruction: receiving, from the network device by using the transceiver, information about the data bandwidth that is used to send the data in the first subband, information about the subcarrier spacing of the first subband, and information about the start frequency location at which the subcarrier mapping is performed in the first subband. Optionally, the processor is further configured to perform the following steps when executing the instruction: receiving, by using the transceiver, information about a filter number of the first subband from the network device, and determining the filter based on the information about the filter number; or the processor is further configured to perform the following step when executing the instruction: receiving, from the network device by using the transceiver, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location of the subcarrier includes a location of a zero frequency.

Optionally, the sent signal may be expressed by using the following formula:

$$s(t) = \sum_n \sum_{k=k_n}^{k_n + N_n^{SC} - 1} a_{n,k-k_n} \cdot e^{j2\pi k \Delta f_n (t - N_{CP,n} T_s)} \otimes f_n(t)$$

where n represents a subband number, k represents a number of a subcarrier in a subband, $k_n$ represents a number of a start frequency at which subcarrier mapping is performed in a subband n, $\Delta f_n$ represents a subcarrier spacing of the subband n, $N_n^{SC}$ represents a quantity of subcarriers in the subband n, $a_{n,k-k_n}$ represents a data symbol mapped onto a subcarrier k of the subband n, $N_{CP,n}$ represents a CP length of the subband n, $f_n(t)$ represents a subband filter of the subband n, $e^{j2\pi k \Delta f_n (t - N_{CP,n} T_s)}$ represents an inverse Fourier transformation factor, $T_s$ is a sampling time interval, and $\otimes$ represents a convolution operation.

Figure 9:
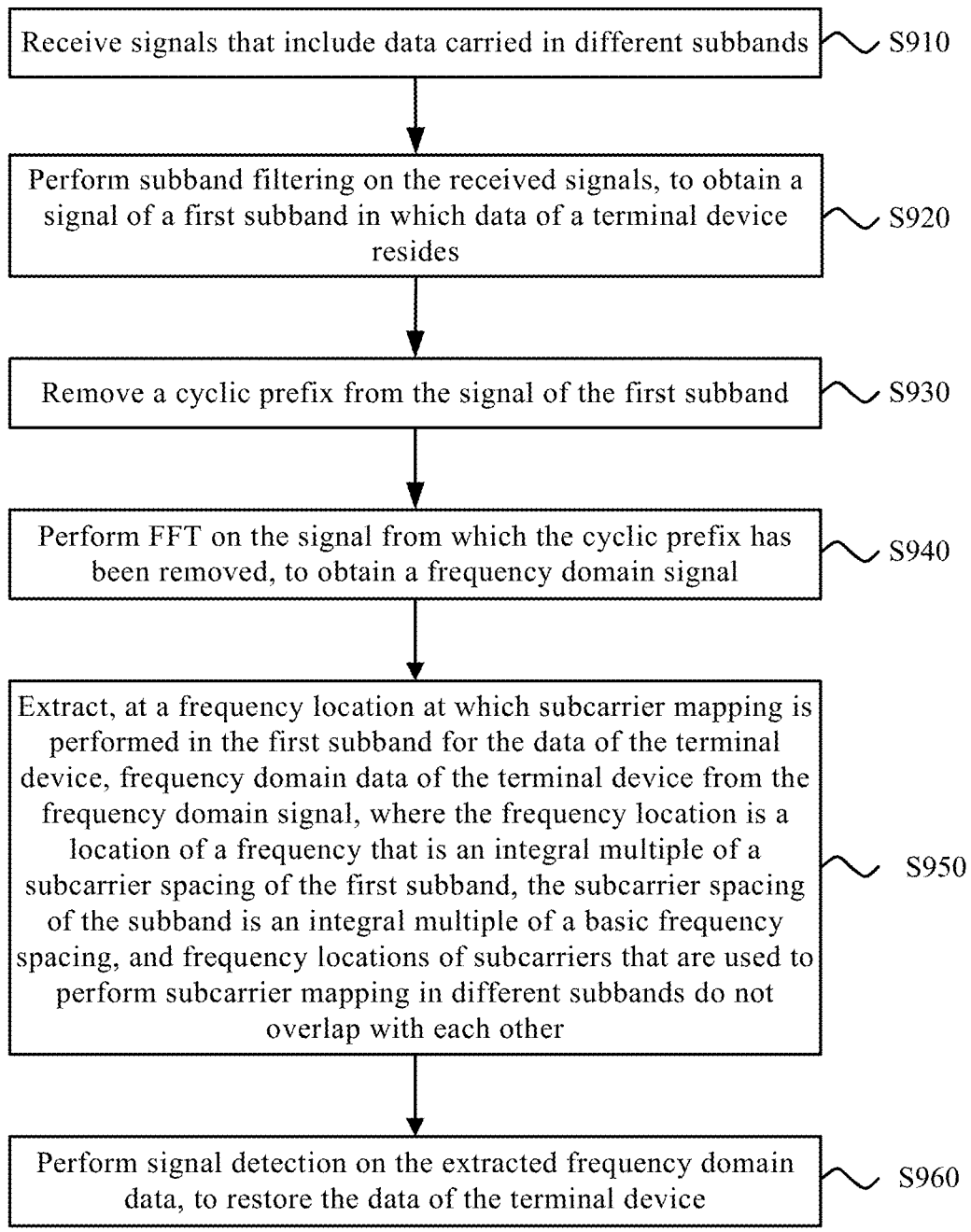
FIG. 9 is a schematic flowchart of a signal receiving method according to an embodiment of the present disclosure.

Based on the foregoing assumptions, an embodiment of the present disclosure provides a signal receiving method. The signal receiving method in this embodiment is a reverse process corresponding to the foregoing signal sending method. The method is performed by a communications device. The communications device may be a network device or a terminal device. In this embodiment, a transmitted signal may be an uplink signal, or may be a downlink signal. As shown in FIG. 9, the method includes the following steps.

910. Receive signals that include data carried in different subbands.

920. Perform subband filtering on the received signals, to obtain a signal of a first subband in which data of a terminal device resides.

930. Remove a cyclic prefix from the signal of the first subband.

940. Perform FFT (fast Fourier transformation) on the signal from which the cyclic prefix has been removed, to obtain a frequency domain signal.

950. Extract, at a frequency location at which subcarrier mapping is performed in the first subband for the data of the terminal device, frequency domain data of the terminal device from the frequency domain signal, where the frequency location is a location of a frequency that is an integral multiple of a subcarrier spacing of the first subband, the subcarrier spacing of the subband is an integral multiple of a basic frequency spacing, and frequency locations of subcarriers that are used to perform subcarrier mapping in different subbands do not overlap with each other.

For related descriptions of the frequency location, the subcarrier spacing, and the basic frequency spacing, refer to the foregoing step 430. Details are not described herein again.

Optionally, the method further includes: determining data bandwidth that is used to send the data of the terminal device in the first subband, the subcarrier spacing of the first subband, and a start frequency location at which the mapping is performed in the first subband; and determining, based on the data bandwidth, the subcarrier spacing of the first subband, and the start frequency location, the frequency location at which the subcarrier mapping is performed in the first subband for the data of the terminal device.

960. Perform signal detection on the extracted frequency domain data, to restore the data of the terminal device.

This embodiment is intended to describe the signal processing method based on the basic settings of the present disclosure. A main advantage of the method is that, the foregoing configuration relationship between subbands is implemented through IFFT transformation, and no extra spectrum shift operation needs to be performed, thereby reducing implementation complexity.

Another embodiment of the present disclosure further provides a signal receiving method. In this embodiment, a sent signal is a downlink signal. The method is performed by a terminal device. The terminal device receives a downlink signal sent by a network device.

A difference between this embodiment and the embodiment corresponding to FIG. 9 is as follows:

The method further includes: receiving, by the terminal device from the network device, information about the data bandwidth that is used to send the data in the first subband, information about the start frequency location at which the mapping is performed in the first subband, and information about the subcarrier spacing of the first subband. All the information may be expressed by using a basic frequency spacing $\Delta f$ and a positive integer not greater than $K_{system}$. For details, refer to the foregoing related description. Details are not described herein again. Optionally, the method further includes: receiving, by the terminal device, information about a filter number from the network device, and determining a filter based on the information about the filter number; or the method further includes: receiving, by the terminal device, from the network device, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location does not include a location of a zero frequency.

Another embodiment of the present disclosure further provides a signal receiving method. In this embodiment, a sent signal is an uplink signal. The method is performed by a network device. The network device receives an uplink signal from a terminal device.

A difference between this embodiment and the embodiment corresponding to FIG. 9 is as follows:

The method further includes: sending, by the network device to the terminal device, information about the data bandwidth that is used to send the data in the first subband, information about the subcarrier spacing of the first subband, and information about the start frequency location at which the subcarrier mapping is performed in the first subband. All the information may be expressed by using a basic frequency spacing $\Delta f$ and a positive integer not greater than $K_{system}$. For details, refer to the foregoing related description. Details are not described herein again. Optionally, the method further includes: sending, by the network device, information about a filter number of the first subband to the terminal device, and determining a filter based on the information about the filter number; or sending, by the network device to the terminal device, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location of the subcarrier includes a location of a zero frequency.

Figure 10:
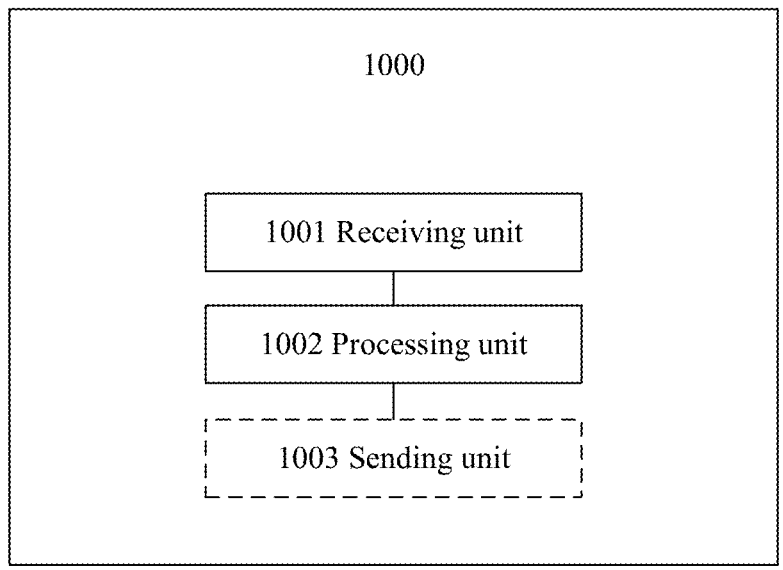
FIG. 10 is a schematic structural diagram of a receiving device according to an embodiment of the present disclosure.

Based on a same idea, an embodiment of the present disclosure provides a receiving device 1000, configured to perform the receiving method embodiments of the present disclosure. For related content, refer to the method description. Details are not described herein again. The receiving device provided in this embodiment of the present disclosure communicates with another sending device. As shown in FIG. 10:

The receiving device 1000 includes a receiving unit 1001 and a processing unit 1002. The processing unit may be specifically a processor, and the receiving unit may be specifically a receiver.

The receiving unit 1001 is configured to receive signals that include data carried in different subbands.

The processing unit 1002 is configured to perform subband filtering on the received signals, to obtain a signal of a first subband in which data of a terminal device resides; remove a cyclic prefix from the signal of the first subband; perform FFT (fast Fourier transformation) on the signal from which the cyclic prefix has been removed, to obtain a frequency domain signal; extract, at a frequency location at which subcarrier mapping is performed in the first subband for the data of the terminal device, frequency domain data of the terminal device from the frequency domain signal, where the frequency location is a location of a frequency that is an integral multiple of a subcarrier spacing of the first subband, the subcarrier spacing of the subband is an integral multiple of a basic frequency spacing, and frequency locations of subcarriers that are used to perform subcarrier mapping in different subbands do not overlap with each other; and perform signal detection on the extracted frequency domain data, to restore the data of the terminal device.

For description of related parameters such as the basic frequency spacing and a frequency spacing of a subcarrier spacing of a subband, refer to the foregoing description. Details are not described herein again.

Optionally, the processing unit 1002 is further configured to: determine data bandwidth that is used to send the data of the terminal device in the first subband, the subcarrier spacing of the first subband, and a start frequency location at which the mapping is performed in the first subband; and determine, based on the data bandwidth, the subcarrier spacing of the first subband, and the start frequency location, the frequency location at which the subcarrier mapping is performed in the first subband for the data of the terminal device. For parameters such as bandwidth of a subband and the frequency location of the subcarrier that is used to perform the subcarrier mapping, refer to the foregoing description. Details are not described herein again.

This embodiment is intended to describe the receiving apparatus. A main advantage of the receiving device is that, the foregoing configuration relationship between subbands is implemented through IFFT transformation, and no extra spectrum shift operation needs to be performed, thereby reducing implementation complexity.

Another embodiment of the present disclosure further provides a receiving apparatus. In this embodiment, a sent signal is a downlink signal. The receiving apparatus may be a terminal device. The terminal device is configured to receive a downlink signal sent by a network device.

A difference between this embodiment and the embodiment corresponding to FIG. 10 is as follows:

The receiving unit 1001 is further configured to receive, from the network device, information about the data bandwidth that is used to send the data in the first subband, information about the start frequency location at which the mapping is performed in the first subband, and information about the subcarrier spacing of the first subband; or the receiving unit 1001 receives information about a filter number from the network device; or the receiving unit receives, from the network device, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location does not include a location of a zero frequency.

Another embodiment of the present disclosure further provides a receiving apparatus. In this embodiment, a sent signal is an uplink signal. The receiving apparatus may be a network device. The network device is configured to receive an uplink signal sent by a terminal device.

A difference between this embodiment and the embodiment corresponding to FIG. 10 is as follows:

The receiving apparatus further includes a sending unit 1003. The sending unit 1003 is configured to send, to the terminal device, information about the data bandwidth that is used to send the data in the first subband, information about the subcarrier spacing of the first subband, and information about the start frequency location at which the subcarrier mapping is performed in the first subband. Optionally, the sending unit 1003 is further configured to send, to the terminal device, information about the data bandwidth that is used to send the data in the first subband, information about the subcarrier spacing of the first subband, and information about the start frequency location at which the subcarrier mapping is performed in the first subband; or the sending unit 1003 is configured to send, to the terminal device, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location of the subcarrier includes a location of a zero frequency.

Figure 11:
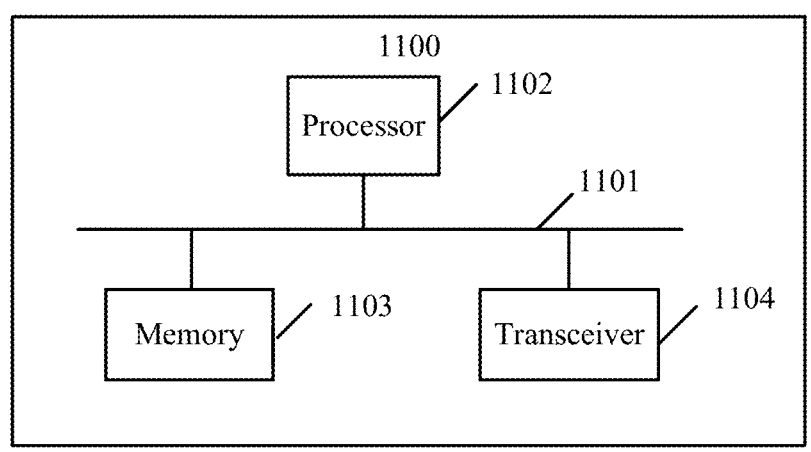
FIG. 11 is a schematic structural diagram of another receiving device according to an embodiment of the present disclosure.

Based on a same technical idea, an embodiment of the present disclosure provides a receiving device 1100, configured to perform the method in the embodiments of the present disclosure. For related content, refer to the method description. Details are not described herein again. As shown in FIG. 11, the device 1100 includes: a bus 1101, and a processor 1102, a memory 1103, and a transceiver 1104 that are separately connected to the bus 1101. The transceiver 1104 may include a receiver and a transmitter.

The transceiver 1104 is configured to communicate with another receiving device.

The memory 1103 is configured to store an instruction.

The processor 1102 is configured to execute the instruction stored in the memory 1103, so as to perform the following steps when executing the instruction:

receiving, by using the transceiver, signals that include data carried in different subbands; performing subband filtering on the received signals, to obtain a signal of a first subband in which data of a terminal device resides; removing a cyclic prefix from the signal of the first subband; performing FFT (fast Fourier transformation) on the signal from which the cyclic prefix has been removed, to obtain a frequency domain signal; extracting, at a frequency location at which subcarrier mapping is performed in the first subband for the data of the terminal device, frequency domain data of the terminal device from the frequency domain signal, where the frequency location is a location of a frequency that is an integral multiple of a subcarrier spacing of the first subband, the subcarrier spacing of the subband is an integral multiple of a basic frequency spacing, and frequency locations of subcarriers that are used to perform subcarrier mapping in different subbands do not overlap with each other; and performing signal detection on the extracted frequency domain data, to restore the data of the terminal device.

For definitions of related parameters such as the subcarrier spacing and the basic frequency spacing, refer to the foregoing related descriptions. Details are not described herein again.

Optionally, the processor 1102 is further configured to perform the following steps when executing the instruction: determining data bandwidth that is used to send the data of the terminal device in the first subband, the subcarrier spacing of the first subband, and a start frequency location at which the mapping is performed in the first subband; and determining, based on the data bandwidth, the subcarrier spacing of the first subband, and the start frequency location, the frequency location at which the subcarrier mapping is performed in the first subband for the data of the terminal device.

This embodiment is intended to describe the receiving apparatus. A main advantage of the receiving device is that, the foregoing configuration relationship between subbands is implemented through IFFT transformation, and no extra spectrum shift operation needs to be performed, thereby reducing implementation complexity.

Another embodiment of the present disclosure further provides a receiving apparatus. In this embodiment, a sent signal is a downlink signal. The sending apparatus may be a terminal device. The terminal device receives a downlink signal sent by a network device.

A difference between this embodiment and the embodiment corresponding to FIG. 11 is as follows:

The processor 1102 is further configured to perform the following step when executing the instruction: receiving, from the network device by using the transceiver 1104, information about the data bandwidth that is used to send the data in the first subband, information about the start frequency location at which the mapping is performed in the first subband, and information about the subcarrier spacing of the first subband. Optionally, the processor 1102 is further configured to perform the following step when executing the instruction: receiving, by using the transceiver, information about a filter number from the network device; or the processor 1102 is further configured to perform the following step when executing the instruction: receiving, from the network device by using the transceiver, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location does not include a location of a zero frequency.

Another embodiment of the present disclosure further provides a receiving apparatus. In this embodiment, a sent signal is an uplink signal. The receiving apparatus may be a network device. The network device receives an uplink signal sent by a terminal device.

A difference between this embodiment and the embodiment corresponding to FIG. 11 is as follows:

The processor 1102 is further configured to perform the following step when executing the instruction: sending, to the terminal device by using the transceiver 1104, information about the data bandwidth that is used to send the data in the first subband, information about the subcarrier spacing of the first subband, and information about the start frequency location at which the subcarrier mapping is performed in the first subband. Optionally, the processor 1102 is further configured to perform the following step when executing the instruction: sending, to the terminal device by using the transceiver 1104, information about the data bandwidth that is used to send the data in the first subband, information about the subcarrier spacing of the first subband, and information about the start frequency location at which the subcarrier mapping is performed in the first subband; or the processor 1102 is further configured to perform the following step when executing the instruction: sending, to the terminal device by using the transceiver 1104, information about the data bandwidth that is used to send the data in the first subband, information about the start frequency location at which the subcarrier mapping is performed in the first subband, and information about a type or a number of the first subband, where the information about the type or the number of the first subband is used to determine the subcarrier spacing of the first subband.

Optionally, the determined frequency location of the subcarrier includes a location of a zero frequency.

It needs to be noted that the foregoing processor may be one processing unit, or may be a collective name of a plurality of processing units. For example, the processor may be a central processing unit (CPU), or may be an application-specific integrated circuit (ASIC), or is one or more integrated circuits configured to implement the embodiments of the present disclosure, for example, one or more microprocessors (DSP), or one or more field programmable gate arrays (FPGA).

The memory may be a storage apparatus, or may be a collective name of a plurality of storage elements, and is configured to store executable program code, parameters and data that are necessary for running of a residential access network device or a terminal, and the like. In addition, the memory may include a random access memory (RAM), or may include a non-volatile memory (NVM), for example, a disk memory or a Flash memory.

The bus may be an industry standard architecture (ISA) bus, a peripheral component interconnect (PCI) bus, or an extended industry standard architecture (EISA) bus, or the like. The bus may be classified into an address bus, a data bus, a control bus, and the like. For ease of representation, only one line is used to represent the bus in the figure, but does not mean that there is only one bus or only one type of bus.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Although some embodiments of the present disclosure have been described, persons skilled in the art may make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art may make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A signal sending method, comprising:
   obtaining to-be-sent frequency domain data;
   determining a first subband for transmitting the data, wherein a subcarrier spacing of the first subband is an integral multiple of a basic frequency spacing;
   performing subcarrier mapping in the first subband for the data, wherein a subcarrier that is used to perform the subcarrier mapping is a subcarrier that is in the determined first subband and located at a frequency that is an integral multiple of the subcarrier spacing of the first subband, and frequency locations of subcarriers that are used to perform subcarrier mapping in different subbands do not overlap with each other;
   performing inverse fast Fourier transformation (IFFT) on the subcarrier obtained after the subcarrier mapping, to obtain a time domain signal;
   performing an operation of adding a cyclic prefix on the time domain signal;
   filtering the signal to which the cyclic prefix has been added; and
   sending the filtered signal.

2. The method according to claim 1, further comprising:
   determining data bandwidth that is used to send the data in the first subband, the subcarrier spacing of the first subband and a start frequency location at which the mapping is performed in the first subband; and
   determining, based on the data bandwidth, the subcarrier spacing of the first subband and the start frequency location, a frequency location of the subcarrier that is used to perform the subcarrier mapping.

3. The method according to claim 2, wherein when the signal is a downlink signal, the method further comprises:
   notifying a terminal device of information about the data bandwidth, information about the start frequency location, and information about the subcarrier spacing of the first subband.

4. The method according to claim 2, wherein when the signal is a downlink signal, the method further comprises:
   notifying a terminal device of information about the data bandwidth, information about the start frequency location and information about a type or a number of the first subband, wherein the information about the type or the number of the first subband is used to determine the subcarrier spacing of the first subband.

5. The method according to claim 2, wherein when the signal is an uplink signal, the method further comprises:
   receiving, from a network device, information about the data bandwidth, information about the subcarrier spacing and information about the start frequency location.

6. The method according to claim 2, wherein when the signal is an uplink signal, the method further comprises:
   receiving, from a network device, information about the data bandwidth, information about the start frequency location and information about a type or a number of the first subband, wherein the information about the type or the number of the first subband is used to determine the subcarrier spacing of the first subband.

7. A receiving method, comprising:
   receiving signals comprising data carried in different subbands;
   performing subband filtering on the received signals to obtain a signal of a first subband in which data of a terminal device resides;
   removing a cyclic prefix from the signal of the first subband;
   performing fast Fourier transformation (FFT) on the signal from which the cyclic prefix has been removed to obtain a frequency domain signal;
   extracting, at a frequency location at which subcarrier mapping is performed in the first subband for the data of the terminal device, frequency domain data of the terminal device from the frequency domain signal, wherein the frequency location is a location of a frequency that is an integral multiple of a subcarrier spacing of the first subband, the subcarrier spacing of the first subband is an integral multiple of a basic frequency spacing, and frequency locations of subcarriers that are used to perform subcarrier mapping in different subbands do not overlap with each other; and
   performing signal detection on the extracted frequency domain data, to restore the data of the terminal device.

8. The method according to claim 7, further comprising:
   determining data bandwidth that is used to send the data of the terminal device in the first subband, the subcarrier spacing of the first subband and a start frequency location at which the mapping is performed in the first subband; and
   determining, based on the data bandwidth, the subcarrier spacing of the first subband and the start frequency location, the frequency location at which the subcarrier mapping is performed in the first subband for the data of the terminal device.

9. The method according to claim 8, wherein when the signal is a downlink signal, the method further comprises:
   receiving, from a network device, information about the data bandwidth, information about the start frequency location and information about the subcarrier spacing of the first subband.

10. The method according to claim 8, wherein when the signal is a downlink signal, the method further comprises:
    receiving, from a network device, information about the data bandwidth, information about the start frequency location and information about a type or a number of the first subband, wherein the information about the type or the number of the first subband is used to determine the subcarrier spacing of the first subband.

11. The method according to claim 8, wherein when the signal is an uplink signal, the method further comprises:
    sending, to the terminal device, information about the data bandwidth, information about the subcarrier spacing of the first subband and information about the start frequency location.

12. The method according to claim 8, wherein when the signal is an uplink signal, the method further comprises:
    sending, to the terminal device, information about the data bandwidth, information about the start frequency location and information about a type or a number of the first subband, wherein the information about the type or the number of the first subband is used to determine the subcarrier spacing of the first subband.

13. A sending apparatus, comprising:
a memory, configured to store instructions; and
a processor, configured to execute the instructions stored in the memory and, when executed by the processor, cause the sending apparatus to:
  obtain to-be-sent frequency domain data,
  determine a first subband for transmitting the data, wherein a subcarrier spacing of the first subband is an integral multiple of a basic frequency spacing,
  perform subcarrier mapping in the first subband for the data, wherein a subcarrier that is used to perform the subcarrier mapping is a subcarrier that is in the determined first subband and located at a frequency that is an integral multiple of the subcarrier spacing of the first subband, and frequency locations of subcarriers that are used to perform subcarrier mapping in different subbands do not overlap with each other,
  perform inverse fast Fourier transformation (IFFT) on the subcarrier obtained after the subcarrier mapping, to obtain a time domain signal,
  perform an operation of adding a cyclic prefix on the time domain signal,
  filter the signal to which the cyclic prefix has been added, and
  send the filtered signal.

14. The apparatus according to claim 13, wherein the instructions stored in the memory, when executed by the processor, further cause the sending apparatus to:
  determine data bandwidth that is used to send the data in the first subband, the subcarrier spacing of the first subband and a start frequency location at which the mapping is performed in the first subband; and
  determine, based on the data bandwidth, the subcarrier spacing of the first subband and the start frequency location, a frequency location of the subcarrier that is used to perform the subcarrier mapping.

15. The apparatus according to claim 14, wherein when the signal is a downlink signal, the instructions stored in the memory, when executed by the processor, further cause the sending apparatus to:
  notify a terminal device of information about the data bandwidth, information about the start frequency location, and information about the subcarrier spacing of the first subband; or
  notify a terminal device of information about the data bandwidth, information about the start frequency location and information about a type or a number of the first subband, wherein the information about the type or the number of the first subband is used to determine the subcarrier spacing of the first subband.

16. The apparatus according to claim 14, wherein when the signal is an uplink signal, the instructions stored in the memory, when executed by the processor, further cause the sending apparatus to:
  receive, from a network device, information about the data bandwidth, information about the subcarrier spacing and information about the start frequency location; or
  receive, from a network device, information about the data bandwidth, information about the start frequency location and information about a type or a number of the first subband, wherein the information about the type or the number of the first subband is used to determine the subcarrier spacing of the first subband.

17. A receiving apparatus, comprising:
a memory, configured to store instructions; and
a processor, configured to execute the instructions stored in the memory and, when executed by the processor, cause the receiving apparatus to:
  receive signals comprising data carried in different subbands,
  perform subband filtering on the received signals, to obtain a signal of a first subband in which data of a terminal device resides,
  remove a cyclic prefix from the signal of the first subband,
  perform fast Fourier transformation (FFT) on the signal from which the cyclic prefix has been removed, to obtain a frequency domain signal,
  extract, at a frequency location at which subcarrier mapping is performed in the first subband for the data of the terminal device, frequency domain data of the terminal device from the frequency domain signal, wherein the frequency location is a location of a frequency that is an integral multiple of a subcarrier spacing of the first subband, the subcarrier spacing of the first subband is an integral multiple of a basic frequency spacing, and frequency locations of subcarriers that are used to perform subcarrier mapping in different subbands do not overlap with each other, and
  perform signal detection on the extracted frequency domain data, to restore the data of the terminal device.

18. The apparatus according to claim 17, wherein the instructions stored in the memory, when executed by the processor, further cause the receiving apparatus to:
  determine data bandwidth that is used to send the data of the terminal device in the first subband, the subcarrier spacing of the first subband and a start frequency location at which the mapping is performed in the first subband; and
  determine, based on the data bandwidth, the subcarrier spacing of the first subband and the start frequency location, the frequency location at which the subcarrier mapping is performed in the first subband for the data of the terminal device.

19. The apparatus according to claim 18, wherein when the signal is a downlink signal, the instructions stored in the memory, when executed by the processor, further cause the receiving apparatus to:
  receive, from a network device, information about the data bandwidth, information about the start frequency location and information about the subcarrier spacing of the first subband; or
  receive, from a network device, information about the data bandwidth, information about the start frequency location and information about a type or a number of the first subband, wherein the information about the type or the number of the first subband is used to determine the subcarrier spacing of the first subband.

20. The apparatus according to claim 18, wherein when the signal is an uplink signal, the instructions stored in the memory, when executed by the processor, further cause the receiving apparatus to:
  send, to the terminal device, information about the data bandwidth, information about the subcarrier spacing of the first subband and information about the start frequency location; or send, to the terminal device, information about the data bandwidth, information about the start frequency location and information about a type or a number of the first subband, wherein the information about the type or the number of the first subband is used to determine the subcarrier spacing of the first subband.

* * * * *